(12) United States Patent
Jiang et al.

(10) Patent No.: US 9,472,215 B1
(45) Date of Patent: Oct. 18, 2016

(54) T-SHAPE SCISSOR SENSOR AND METHOD OF MAKING THE SAME

(71) Applicant: HGST Netherlands B.V., Amsterdam (NL)

(72) Inventors: Hongquan Jiang, San Jose, CA (US); Quang Le, San Jose, CA (US); Xiaoyong Liu, San Jose, CA (US); Lei Wang, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/745,282

(22) Filed: Jun. 19, 2015

(51) Int. Cl.
 *G11B 5/39* (2006.01)

(52) U.S. Cl.
 CPC .......... *G11B 5/3912* (2013.01); *G11B 5/3906* (2013.01); *G11B 5/398* (2013.01)

(58) Field of Classification Search
 CPC . G11B 5/3903; G11B 5/3906; G11B 5/3912; G11B 5/3932; G11B 5/398
 USPC ...................................... 360/319, 324–324.2
 See application file for complete search history.

(56) References Cited

U.S. PATENT DOCUMENTS

| | | | | |
|---|---|---|---|---|
| 7,599,156 B2 * | 10/2009 | Kishi | ...................... | G11C 11/15 360/324.11 |
| 7,834,385 B2 * | 11/2010 | Dimitrov | ................ | G11C 11/16 257/295 |
| 8,018,691 B2 | 9/2011 | Gill | | |
| 8,390,963 B2 | 3/2013 | Dimitrov | | |
| 8,582,247 B2 | 11/2013 | Song | | |
| 8,582,250 B2 | 11/2013 | Qiu | | |
| 8,670,217 B1 * | 3/2014 | Braganca | ............. | G11B 5/3909 360/324.12 |
| 8,724,265 B2 | 5/2014 | Qiu | | |
| 8,749,926 B1 | 6/2014 | Le | | |
| 8,767,356 B2 * | 7/2014 | Leung | .................... | B82Y 25/00 360/324.12 |
| 8,842,396 B1 | 9/2014 | Zhu | | |
| 2003/0214763 A1 * | 11/2003 | Childress | ............... | B82Y 10/00 360/324.2 |
| 2006/0082933 A1 * | 4/2006 | Kishi | ...................... | G11C 11/15 360/324.11 |
| 2006/0139818 A1 * | 6/2006 | Inaba | ...................... | G11C 11/16 360/324.12 |
| 2009/0154025 A1 * | 6/2009 | Carey | .................... | B82Y 10/00 360/314 |
| 2010/0033880 A1 * | 2/2010 | Dimitrov | ............ | G11C 11/5607 360/324.1 |
| 2010/0110777 A1 * | 5/2010 | Katou | ..................... | G11C 11/16 365/158 |
| 2012/0229935 A1 * | 9/2012 | Song | ...................... | B82Y 25/00 360/313 |
| 2012/0270073 A1 * | 10/2012 | Covington | ............. | B82Y 10/00 428/812 |
| 2014/0146419 A1 | 5/2014 | Covington et al. | | |

OTHER PUBLICATIONS

Tuggle et al., "A Dual Free Layer Sensor With Side Shields," IEEE—Transactions on Magnetics, vol. 48, No. 11, Nov. 2012, pp. 3547-3550.

Zhu, J. "New Heights for Hard Disk Drives," Materials Today, Jul./Aug. 2003, pp. 22-30.

* cited by examiner

*Primary Examiner* — Will J Klimowicz
(74) *Attorney, Agent, or Firm* — Zilka-Kotab, PC

(57) ABSTRACT

According to one embodiment, a magnetic sensor includes a lower scissor free layer, and an upper scissor free layer above the lower scissor free layer in a track direction, where at least one of the scissor free layers has a generally T-shaped periphery. According to another embodiment, a method includes forming a lower scissor free layer, and forming an upper scissor free layer above the lower scissor free layer in a track direction, where at least one of the one of the scissor free layers has a generally T-shaped periphery.

13 Claims, 34 Drawing Sheets

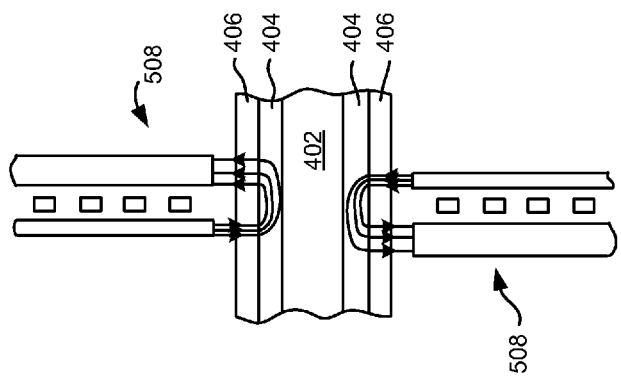
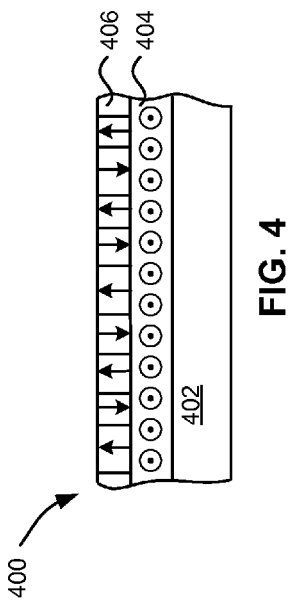
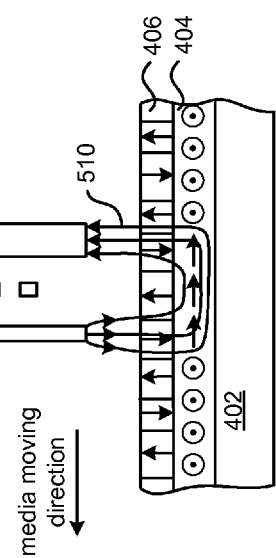

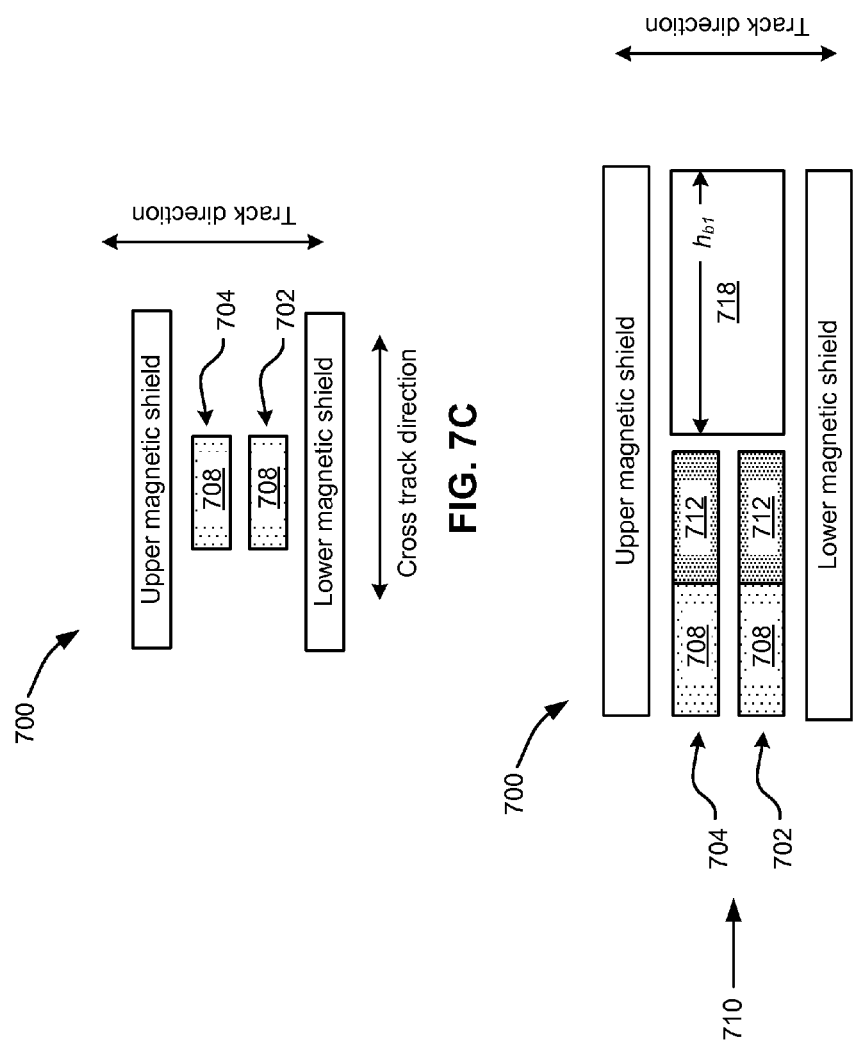

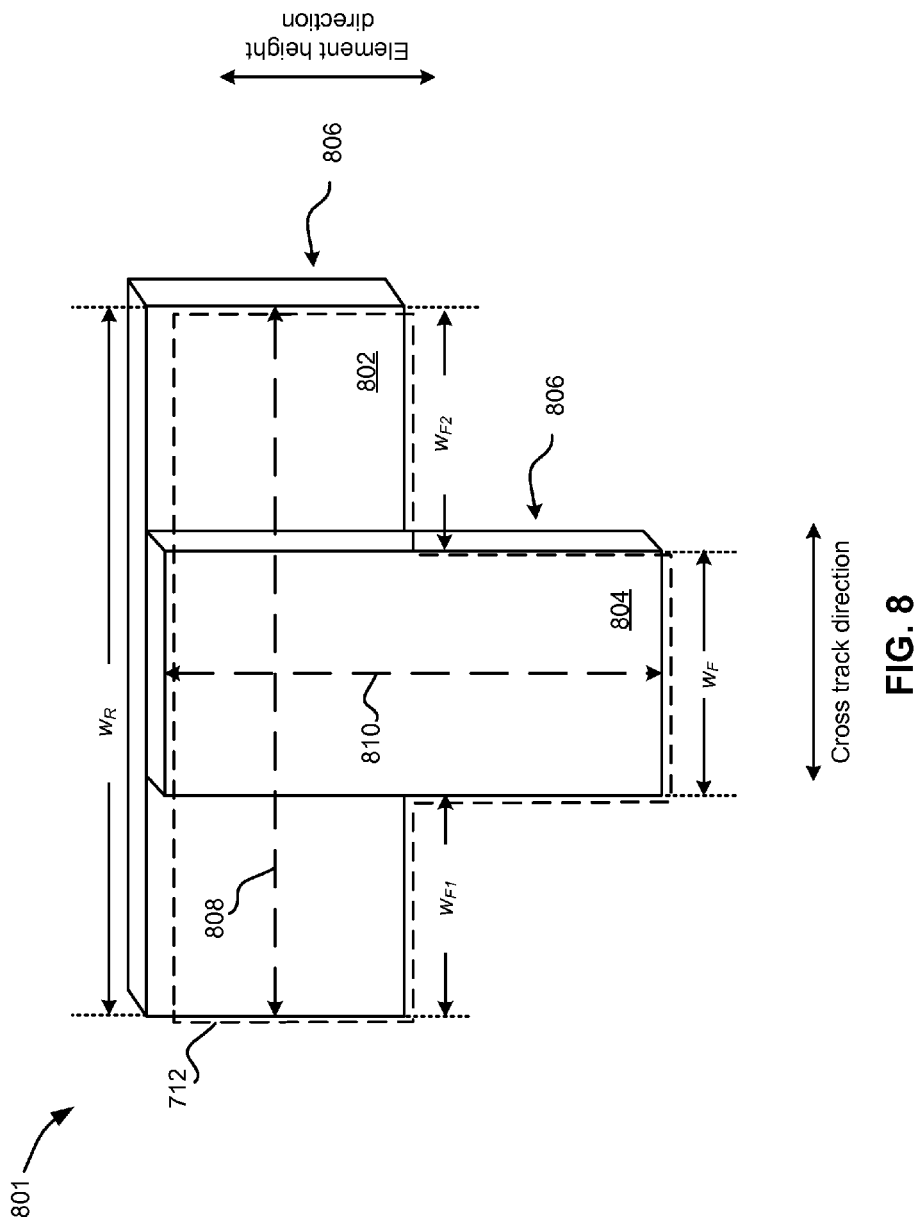

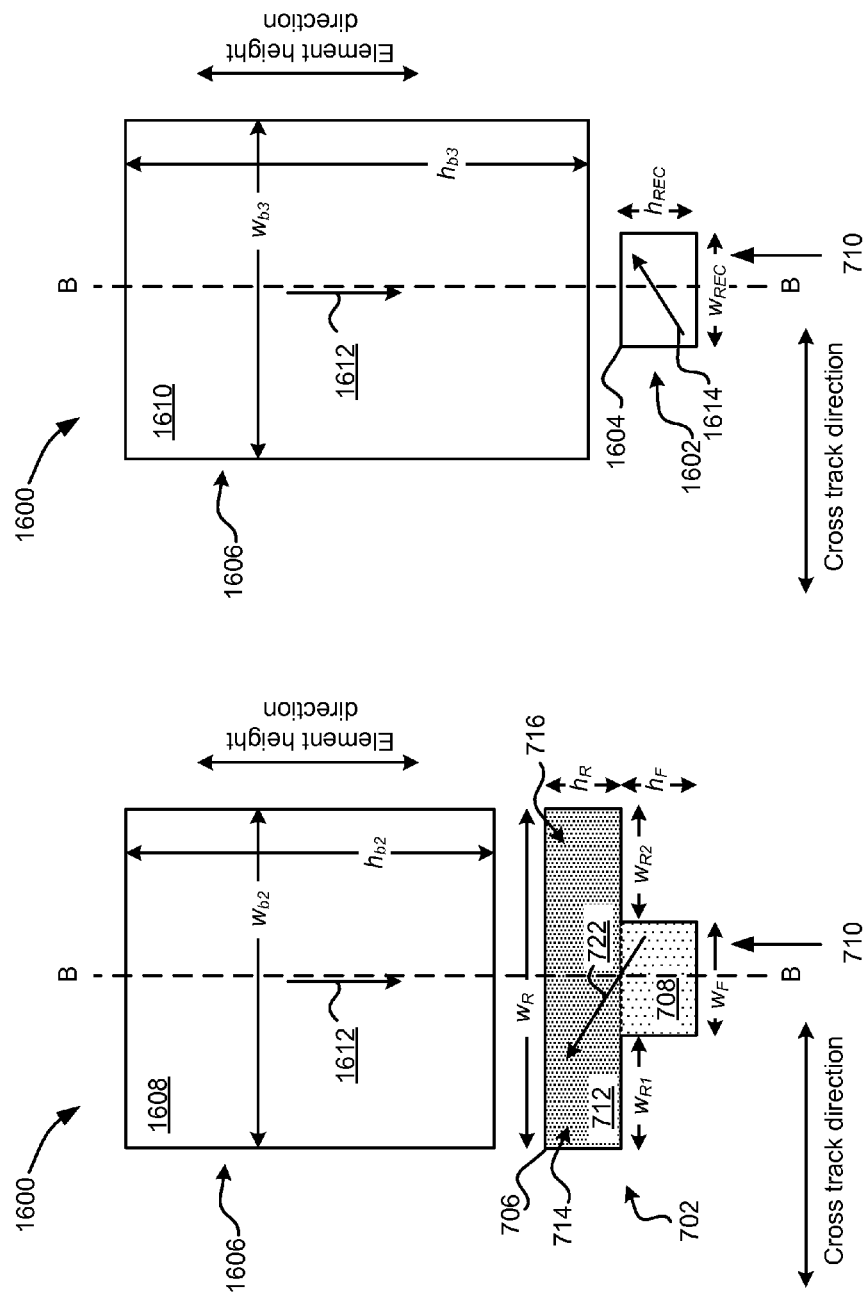

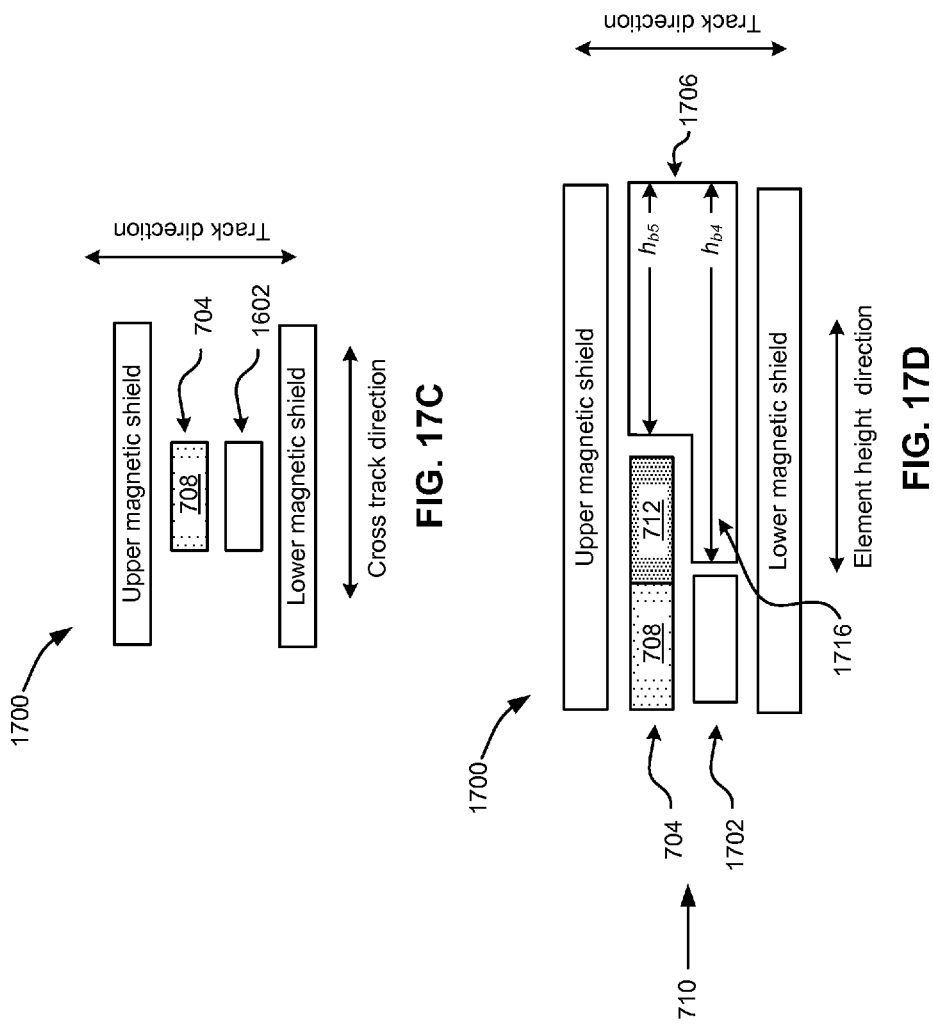

Top down view
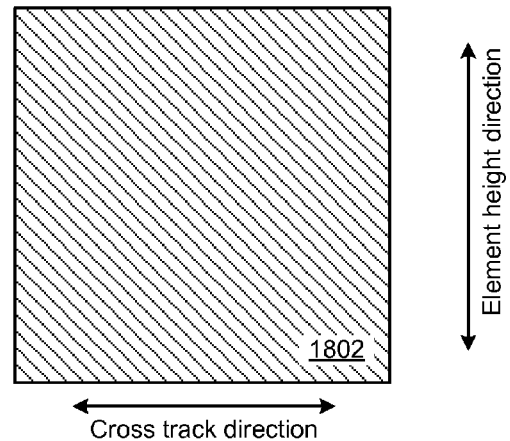
Side view
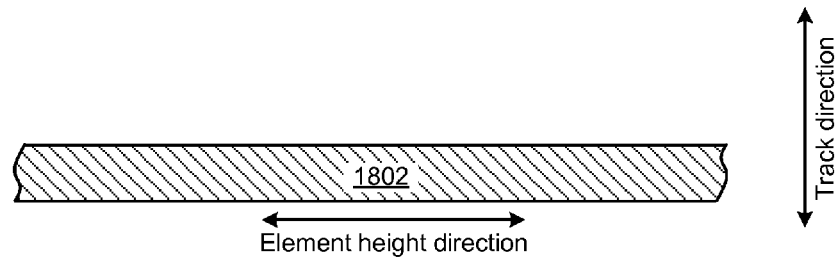
Media facing side view
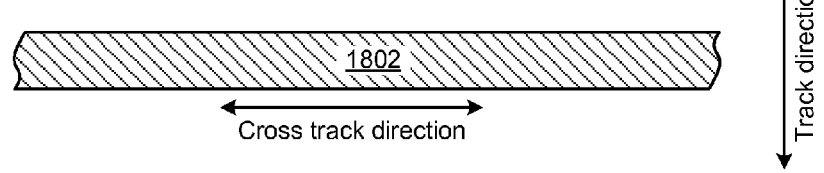
FIG. 18A Top down view
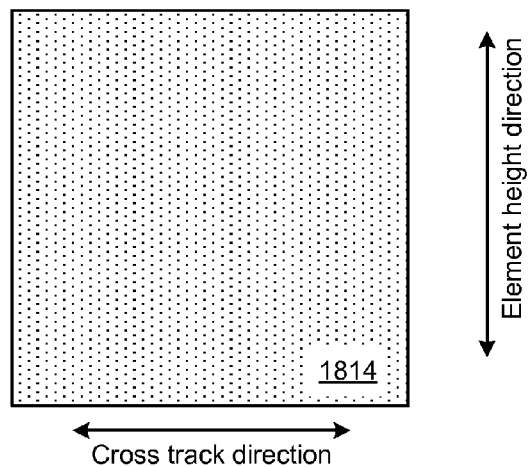
Side view
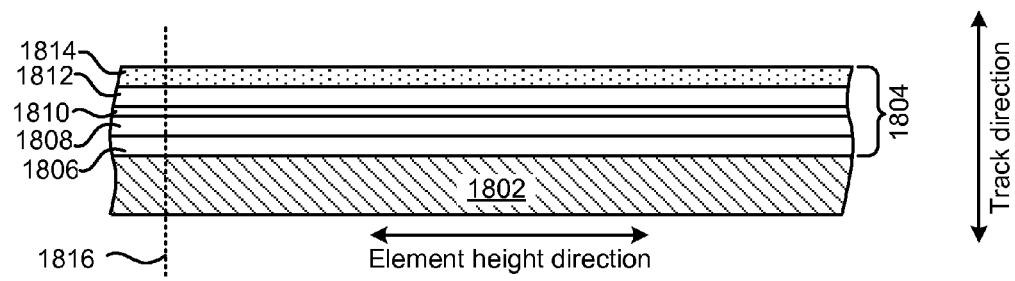
Media facing side view
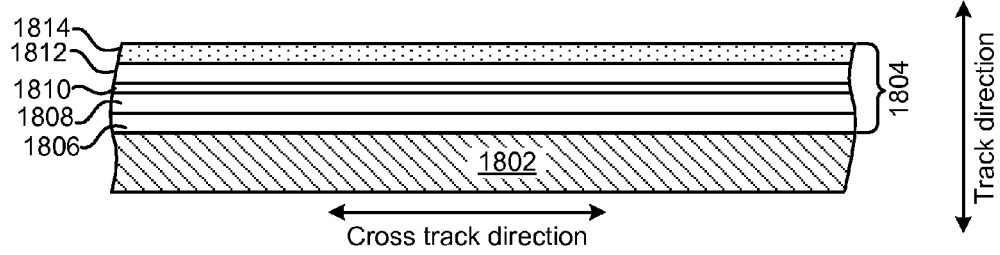
FIG. 18B Top down view
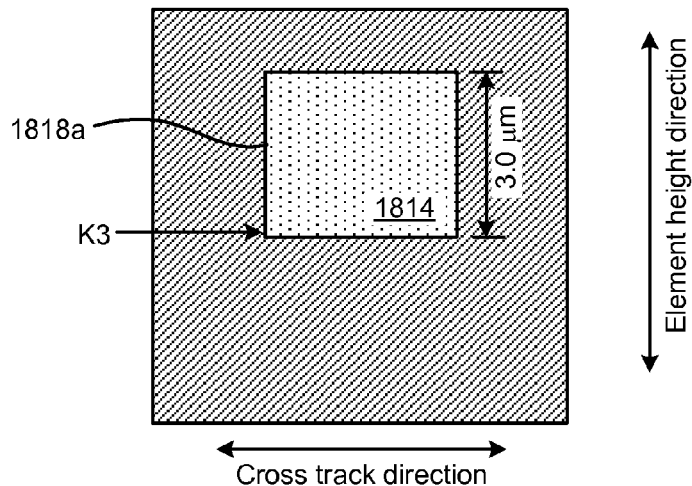
Side view
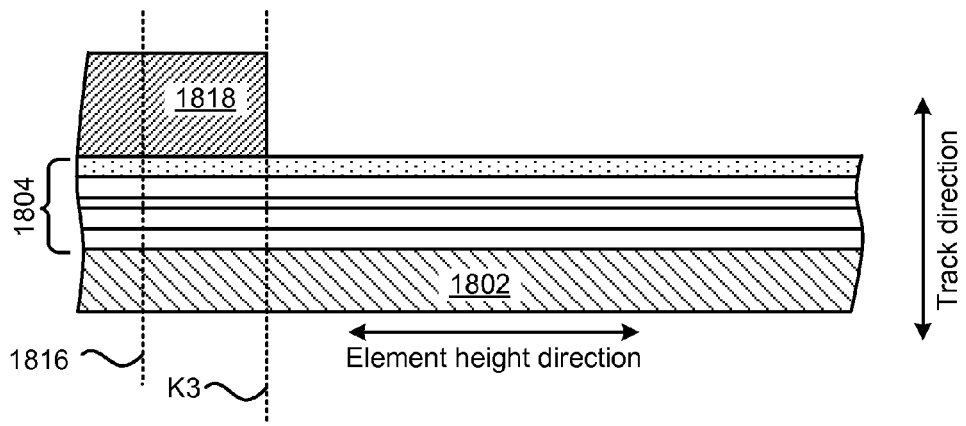
Media facing side view
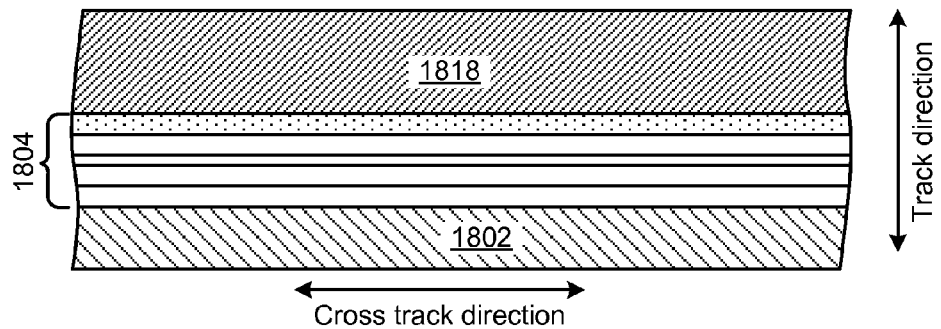
FIG. 18C

Top down view
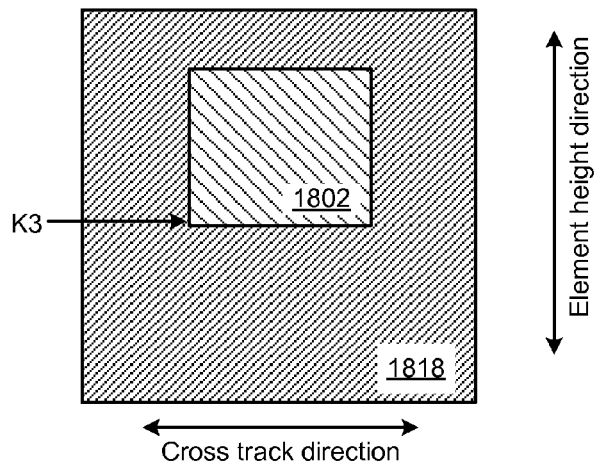
Side view
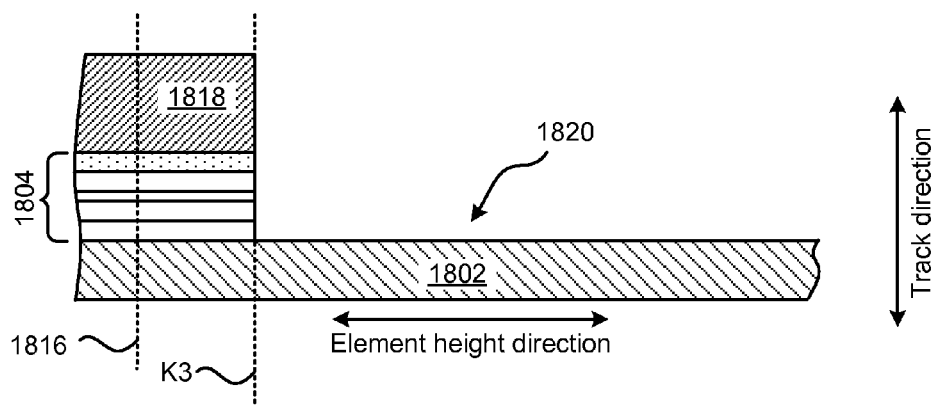
Media facing side view
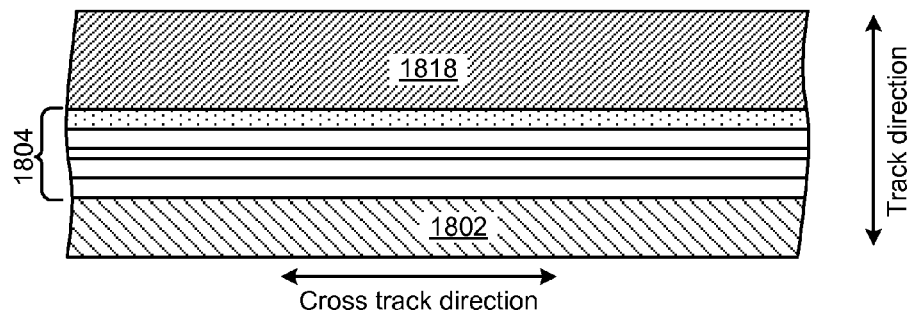
FIG. 18D Top down view
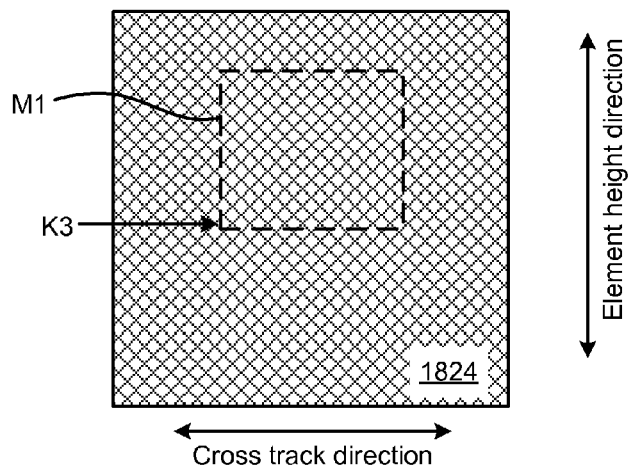
Side view
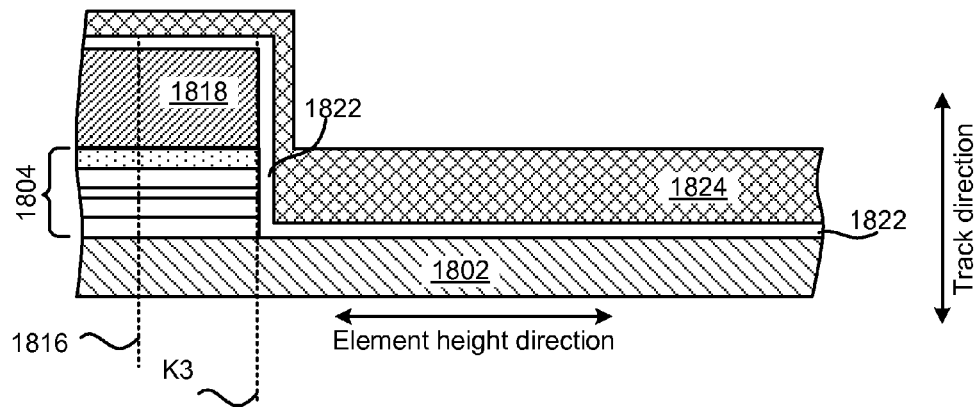
Media facing side view
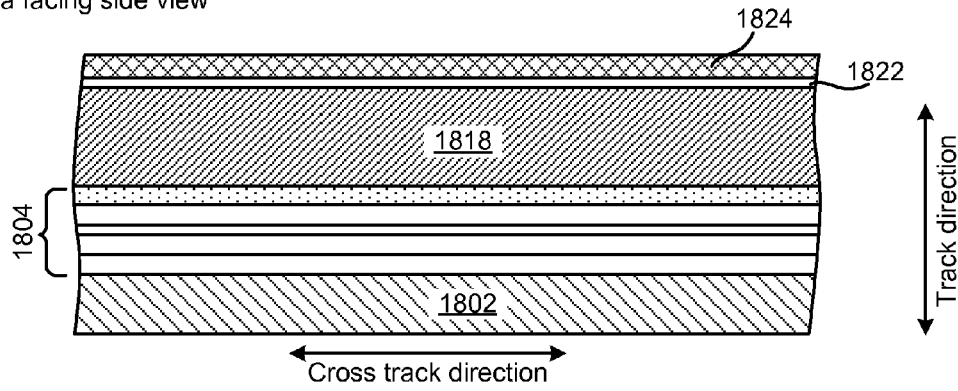
FIG. 18E Top down view
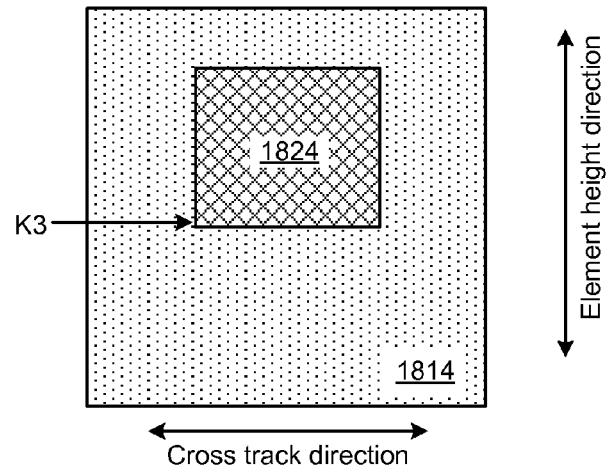
Side view
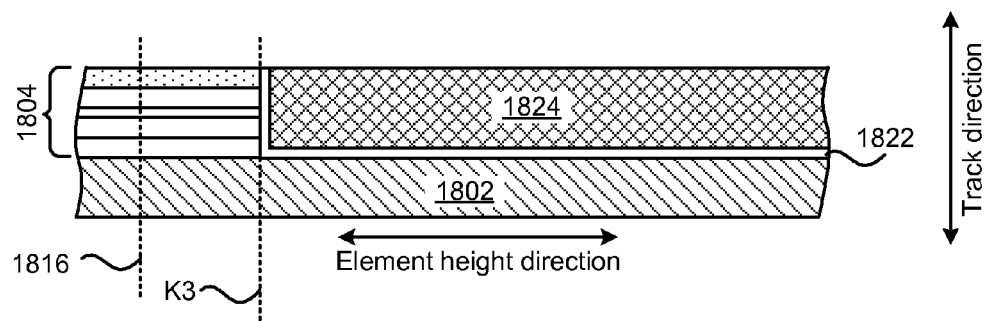
Media facing side view
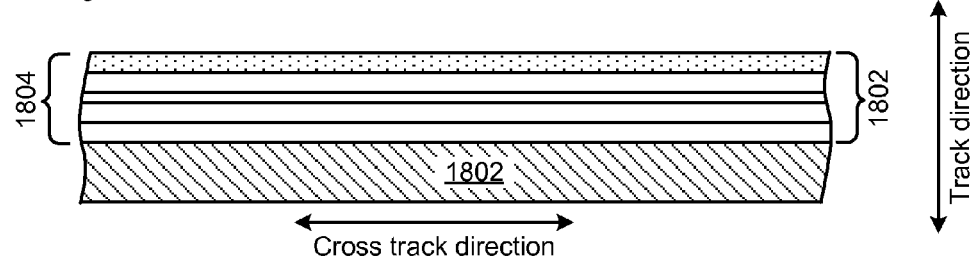
FIG. 18F Top down view
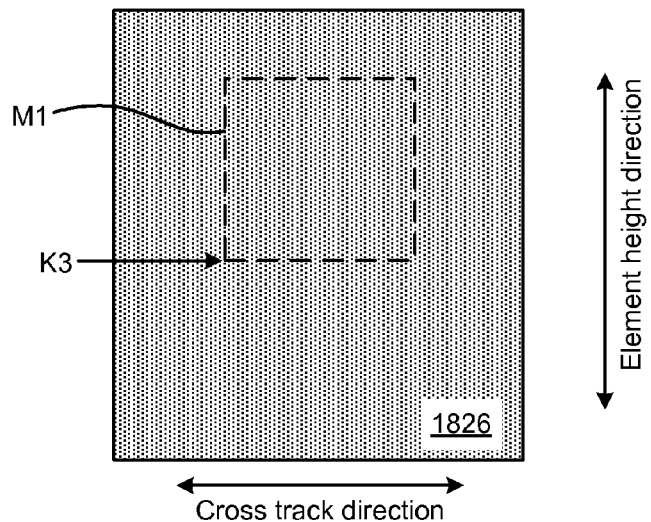
Side view
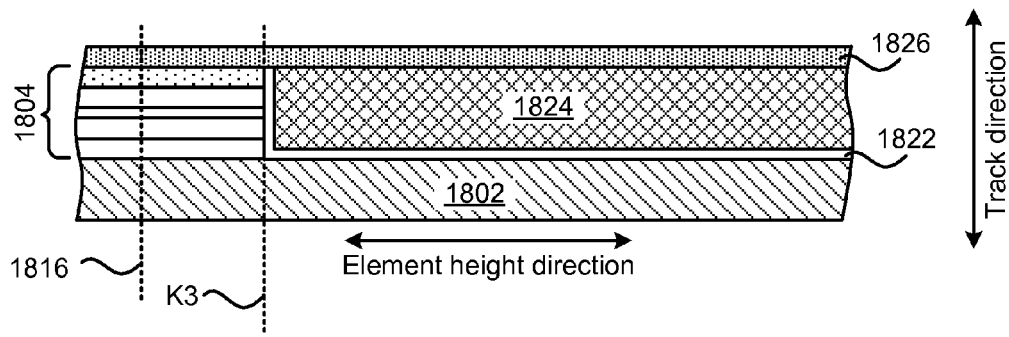
Media facing side view
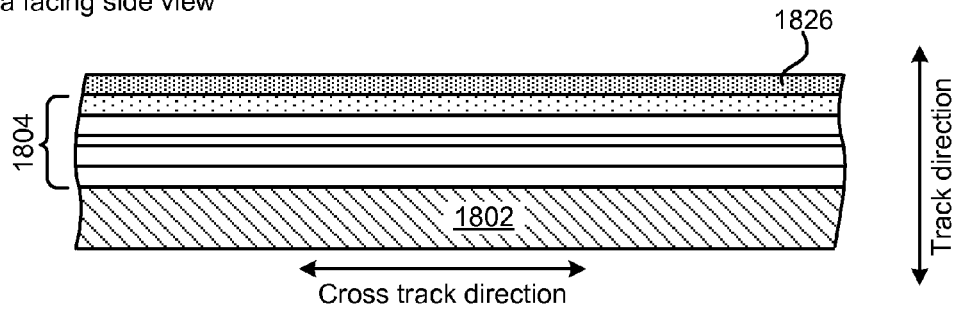
FIG. 18G

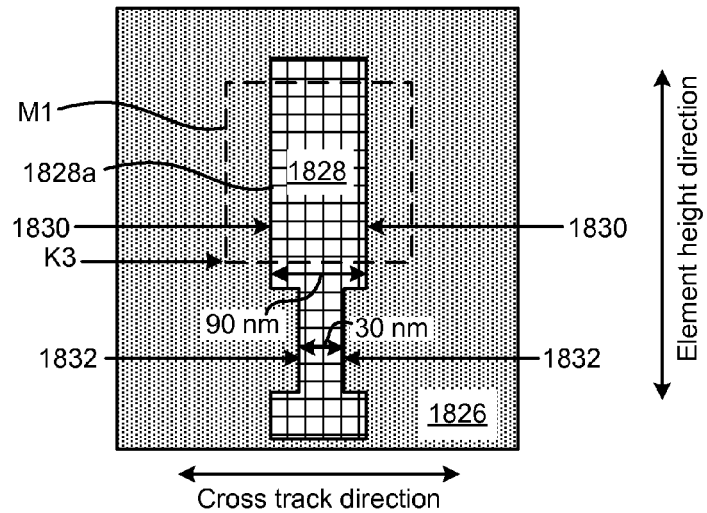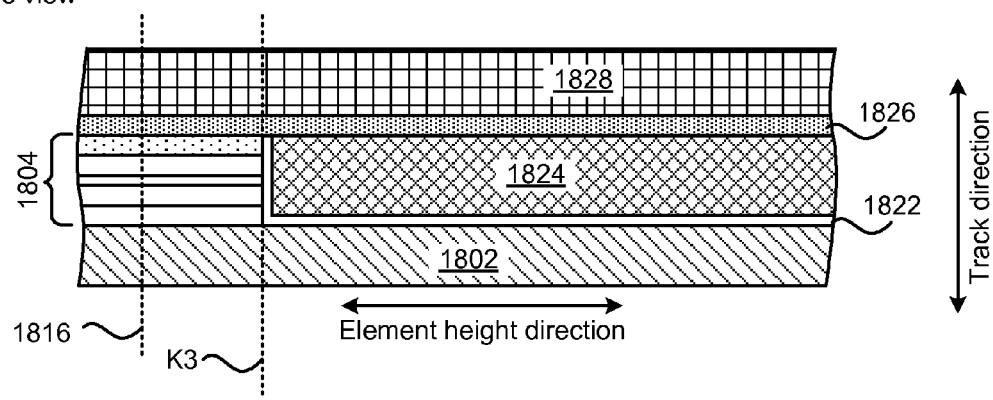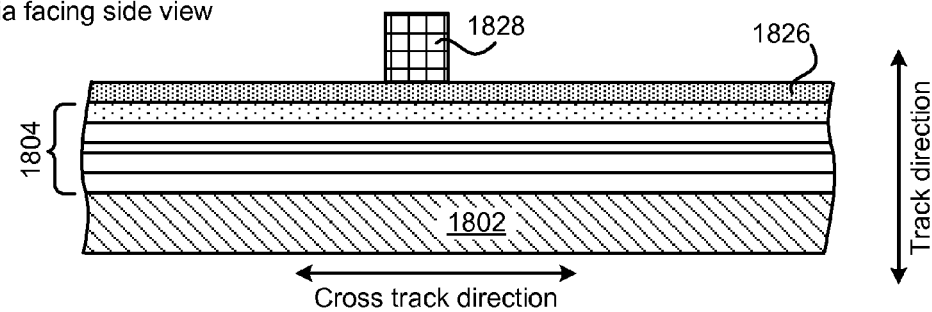
FIG. 18H

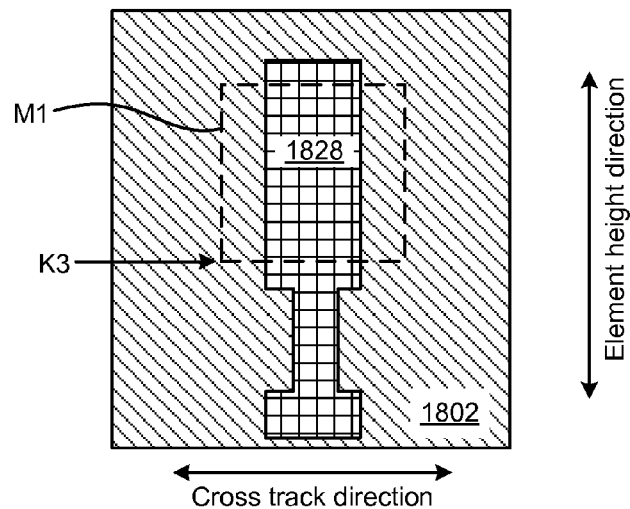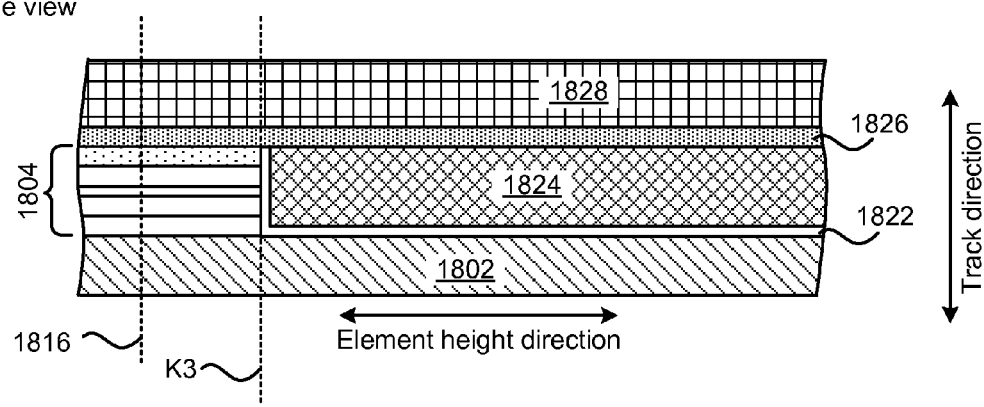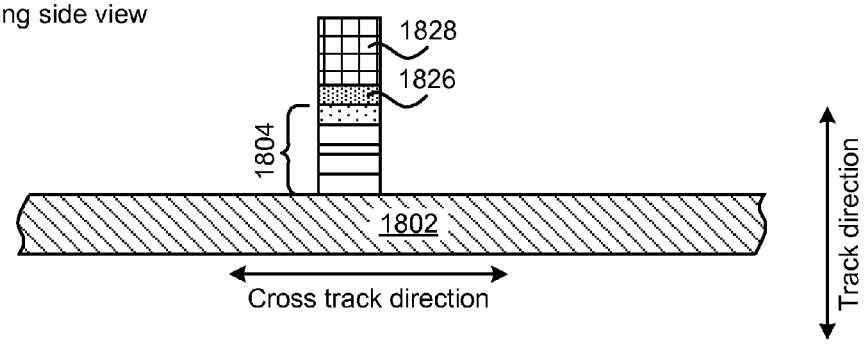
FIG. 18I

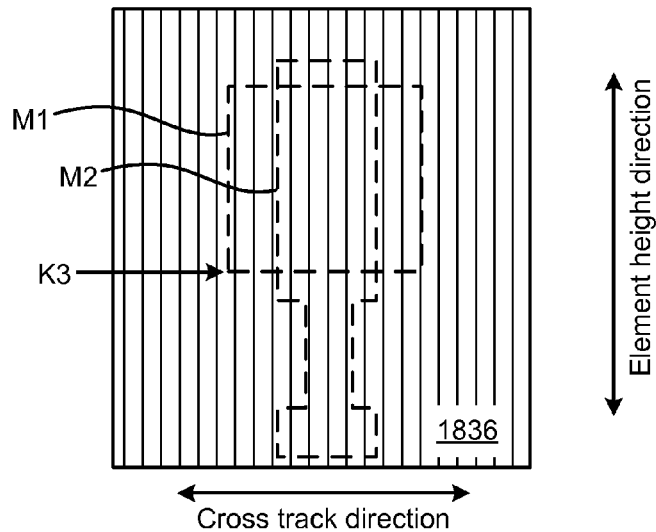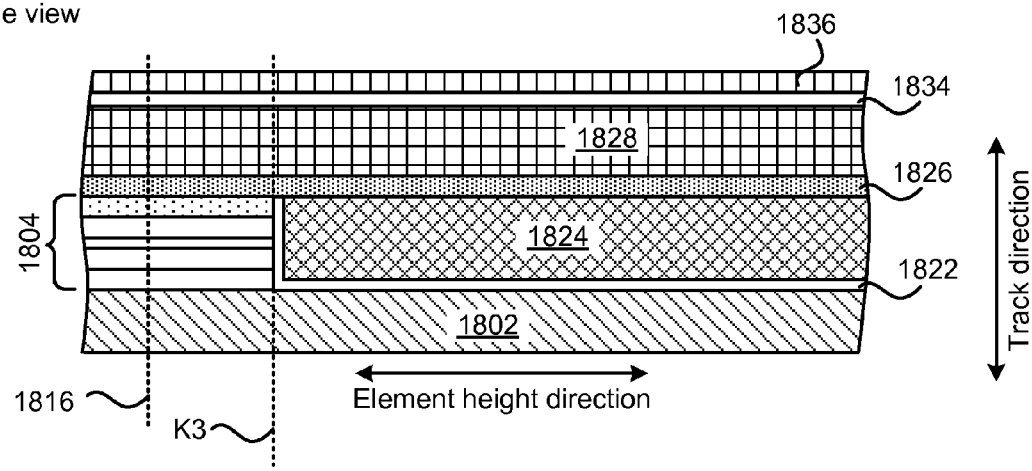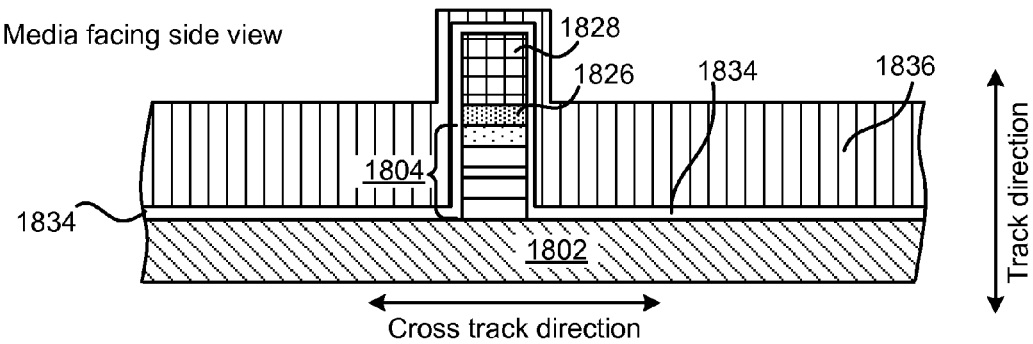
FIG. 18J

Top down view
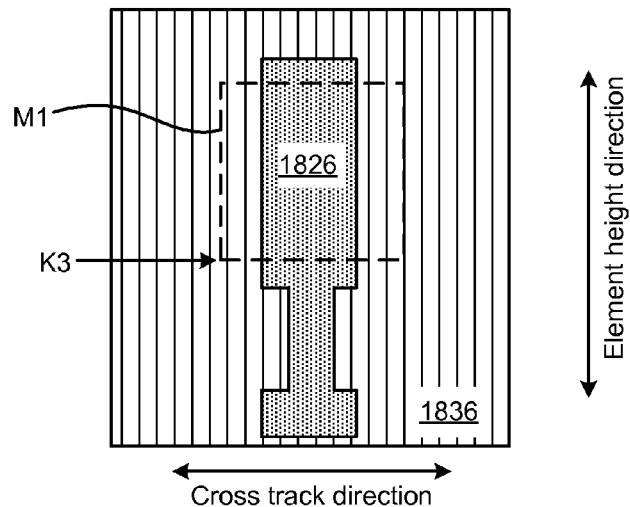
Side view
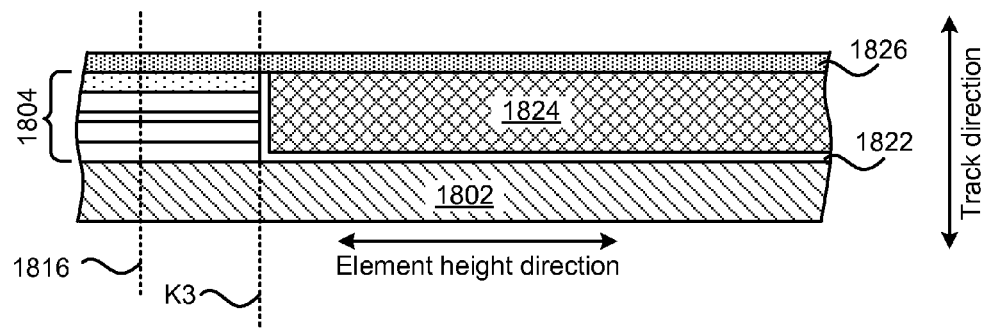
Media facing side view
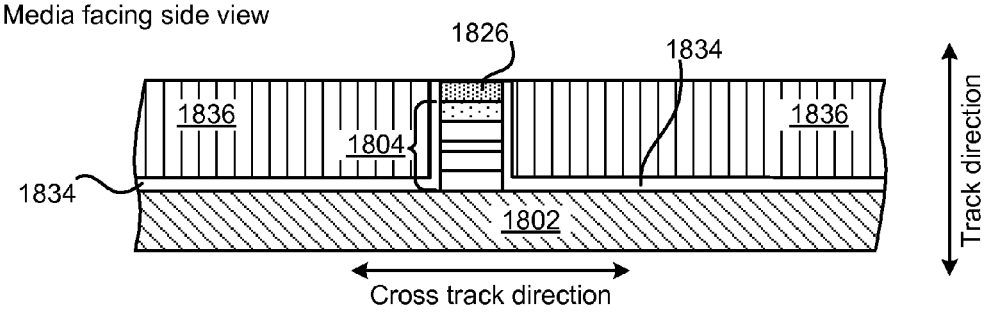
FIG. 18K

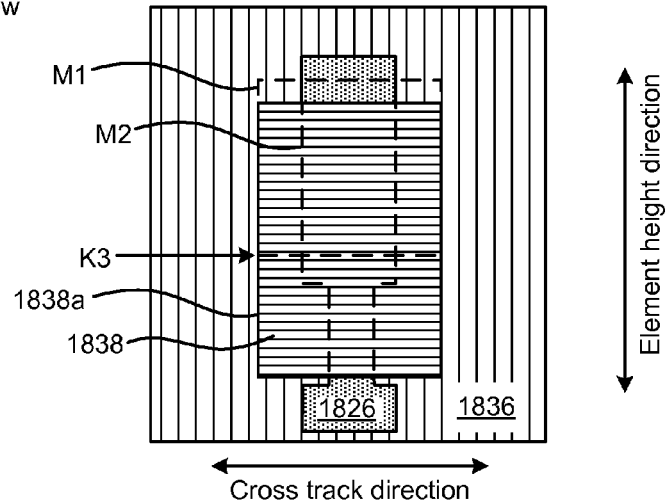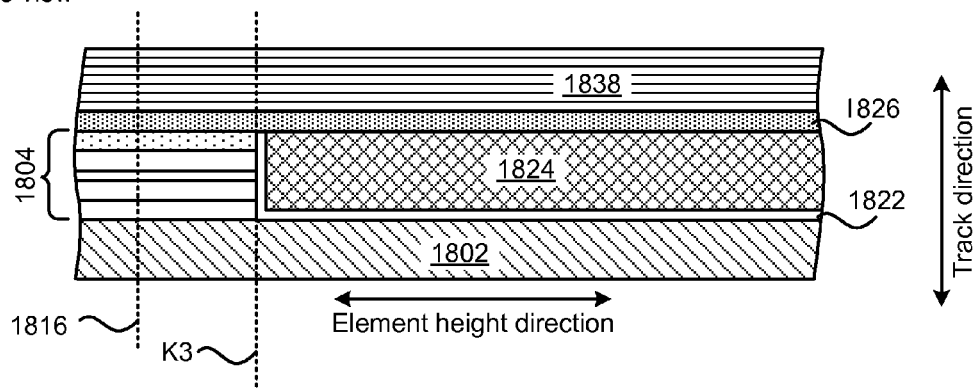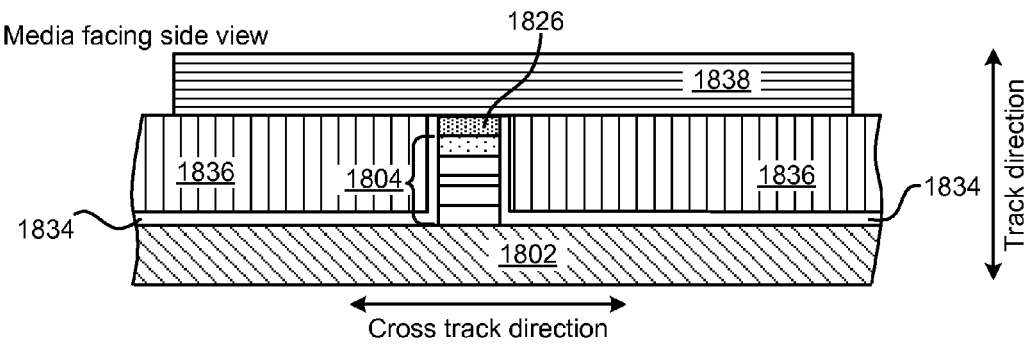
FIG. 18L

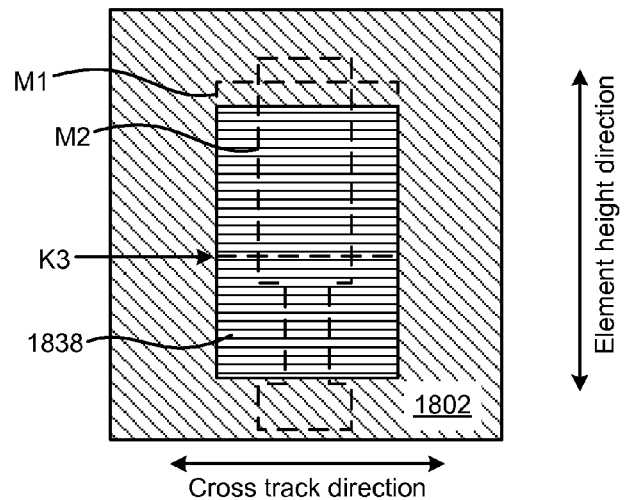
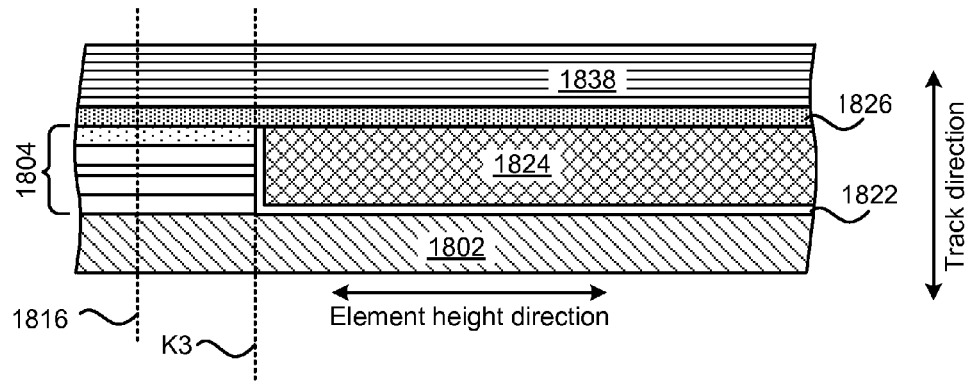
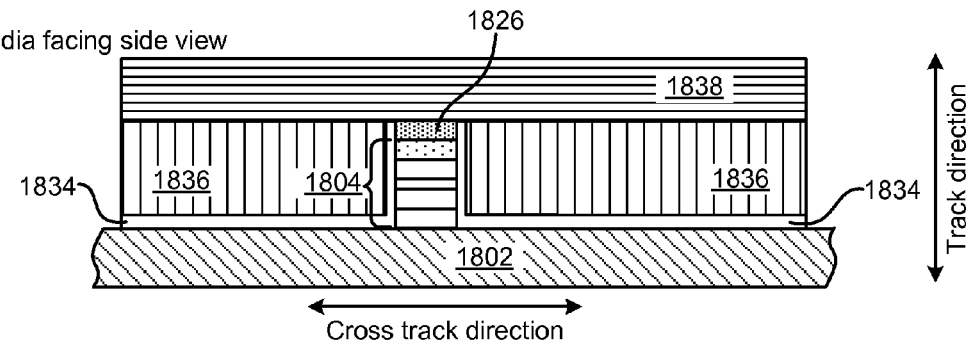
FIG. 18M

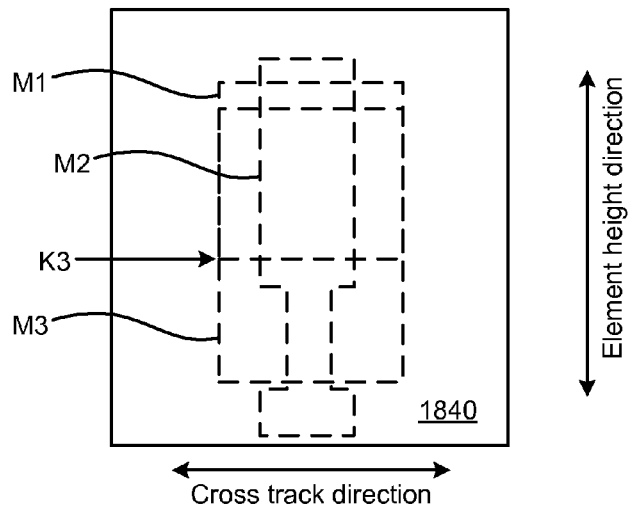
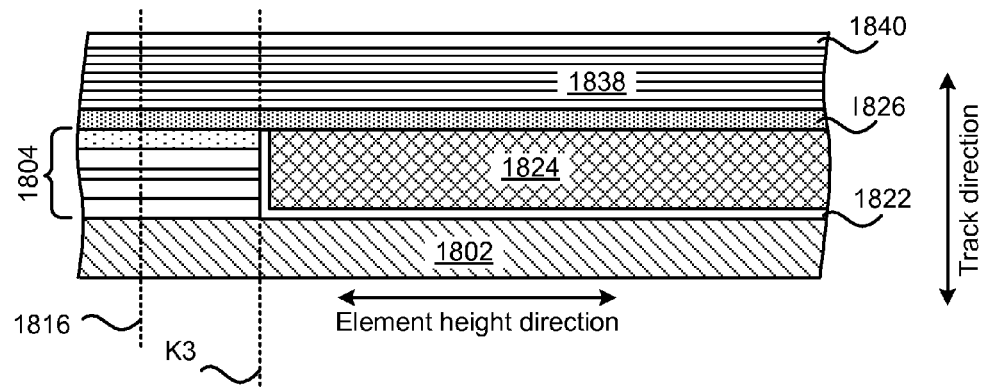
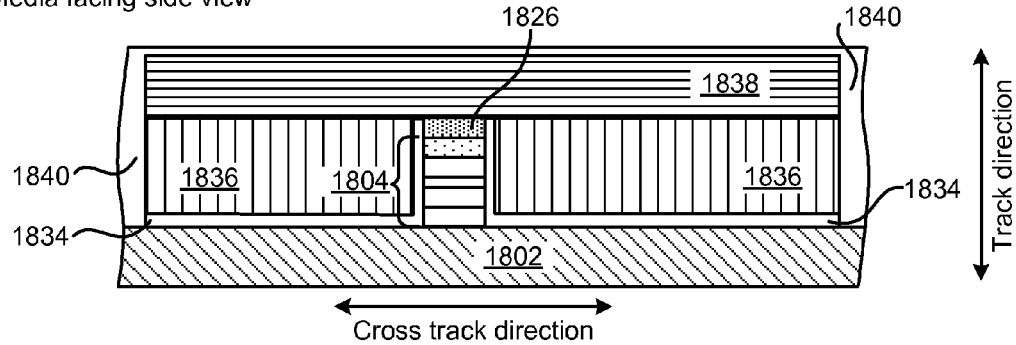
FIG. 18N

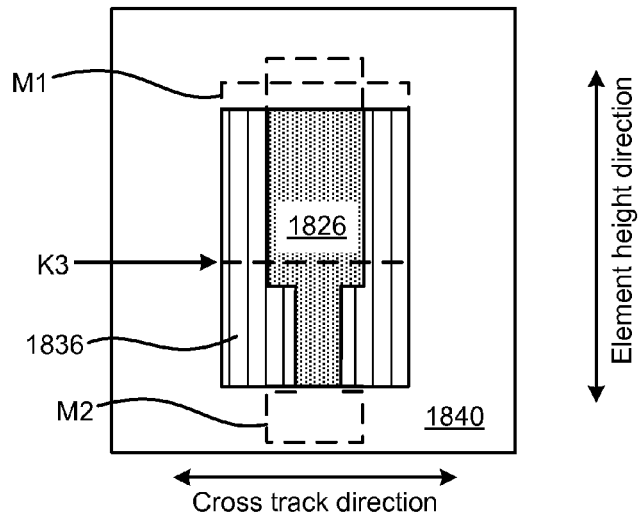
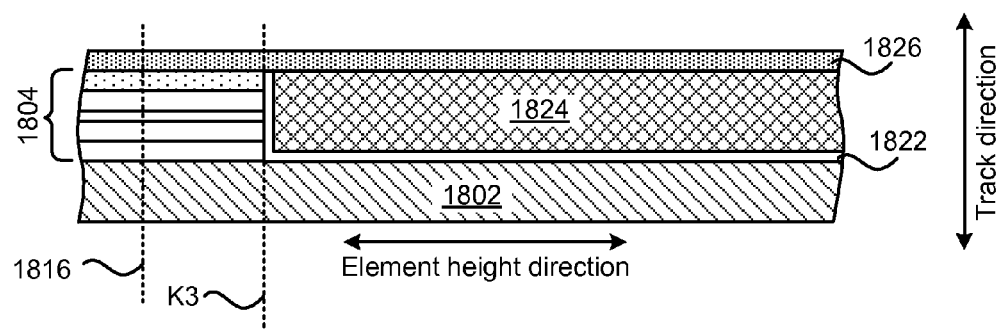
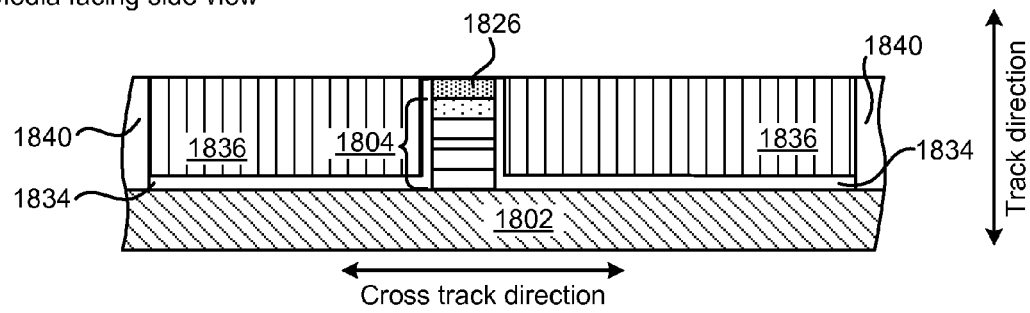
FIG. 18O

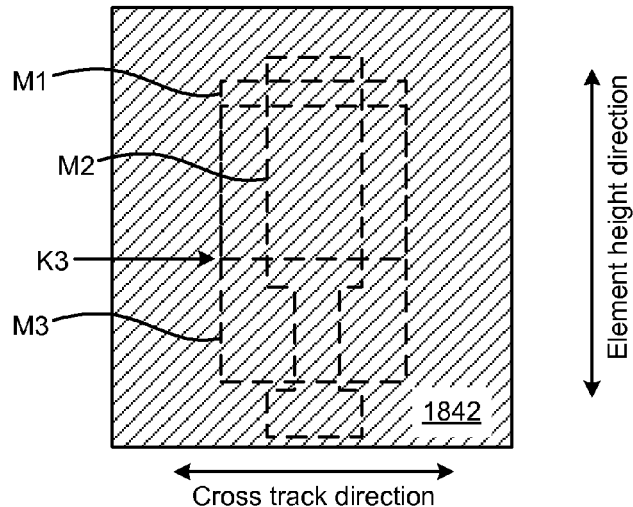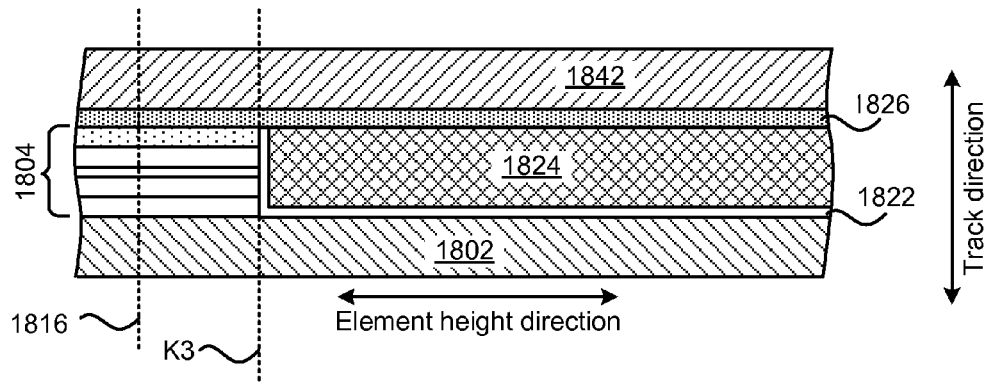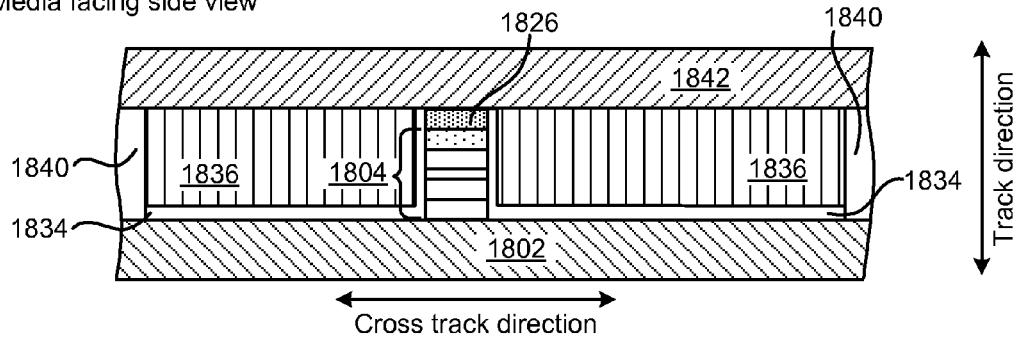
FIG. 18P

T-SHAPE SCISSOR SENSOR AND METHOD OF MAKING THE SAME

FIELD OF THE INVENTION

The present invention relates to data storage systems, and more particularly, this invention relates to scissor type magnetoresistive sensors having a general T-shape, and methods of making the same.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected data tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to meeting this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. As areal density increases the read transducers need to be smaller and closer together, which results in cross-talk, interference, and/or degradation of performance of the various components, such as sensors, within the magnetic heads.

SUMMARY

According to one embodiment, a magnetic sensor includes a lower scissor free layer, and an upper scissor free layer above the lower scissor free layer in a track direction, where at least one of the scissor free layers has a generally T-shaped periphery.

According to another embodiment, a method includes forming a lower scissor free layer, and forming an upper scissor free layer above the lower scissor free layer in a track direction, where at least one of the one of the scissor free layers has a generally T-shaped periphery.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 is a schematic representation of a perpendicular recording medium, according to one embodiment.

FIG. 5A is a schematic representation of a recording head and the perpendicular recording medium of FIG. 4, according to one embodiment.

FIG. 5B is a schematic representation of a recording apparatus configured to record separately on both sides of a perpendicular recording medium, according to one embodiment.

FIGS. 7A-7D provide various views of a schematic representation of a magnetic read head including lower and upper scissor free layers, each of which have a generally T-shaped periphery, according to one embodiment.

FIG. 8 is a schematic representation of a scissor free layer having a generally T-shaped periphery, and which includes two separate layers, according to one embodiment.

FIGS. 16A-16D provide various views of a simplified schematic representation of a magnetic read head that includes a lower scissor free layer having a generally T-shaped periphery, and an upper scissor free layer having a generally rectangular periphery, according to one embodiment.

FIGS. 17A-17D provide various views of a simplified magnetic read head that includes a lower scissor free layer having a generally rectangular periphery, and an upper scissor free layer having a generally T-shaped periphery, according to one embodiment.

FIGS. 18A-18P shows a T-shaped scissor sensor in various intermediate stages of manufacture in order to illustrate a method of manufacturing a T-shaped scissor sensor, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic sensor includes a lower scissor free layer, and an upper scissor free layer above the lower scissor free layer in a track direction, where at least one of the scissor free layers has a generally T-shaped periphery.

In another general embodiment, a method includes forming a lower scissor free layer, and forming an upper scissor free layer above the lower scissor free layer in a track direction, where at least one of the one of the scissor free layers has a generally T-shaped periphery.

Figure 1:
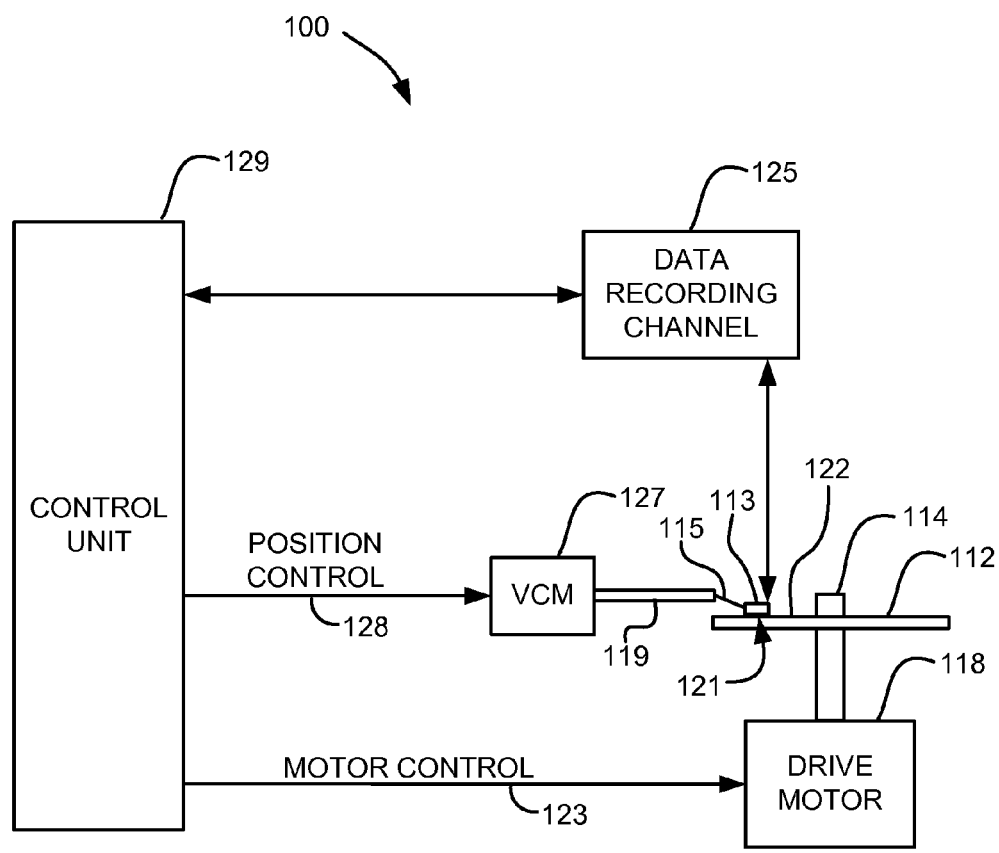
FIG. 1 is a simplified drawing of a magnetic recording disk drive system, according to one embodiment.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

Regarding a magnetic head, an inductive write portion therein includes a coil layer embedded in one or more insulation layers (insulation stack), the insulation stack being located between first and second pole piece layers. A gap may be formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
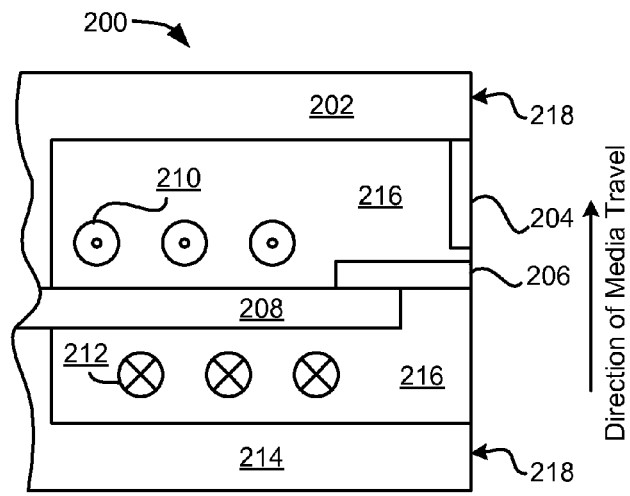
FIG. 2A is a cross-sectional view of a perpendicular magnetic head with helical coils, according to one embodiment.

FIG. 2A is a cross-sectional view of a perpendicular magnetic head 200, according to one embodiment. In FIG. 2A, helical coils 210 and 212 are used to create magnetic flux in the stitch pole 208, which then delivers that flux to the main pole 206. Coils 210 indicate coils extending out from the page, while coils 212 indicate coils extending into the page. Stitch pole 208 may be recessed from the ABS 218. Insulation 216 surrounds the coils and may provide support for some of the elements. The direction of the media travel, as indicated by the arrow to the right of the structure, moves the media past the lower return pole 214 first, then past the stitch pole 208, main pole 206, trailing shield 204 which may be connected to the wrap around shield (not shown), and finally past the upper return pole 202. Each of these components may have a portion in contact with the ABS 218. The ABS 218 is indicated across the right side of the structure.

Perpendicular writing is achieved by forcing flux through the stitch pole 208 into the main pole 206 and then to the surface of the disk positioned towards the ABS 218.

Figure 2B:
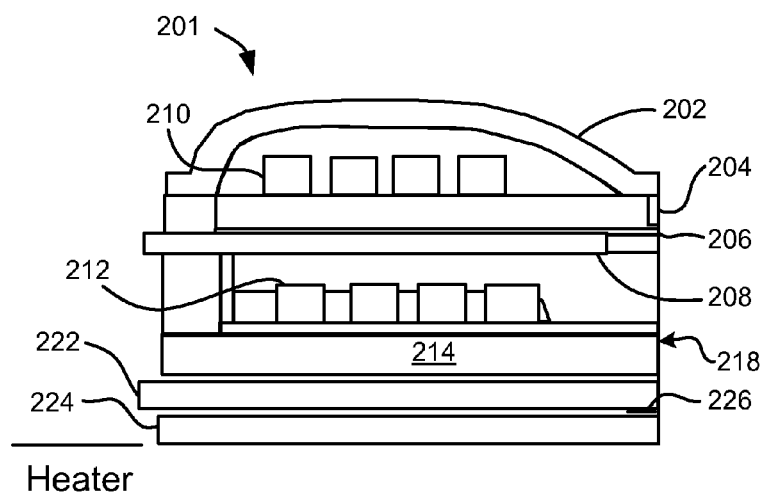
FIG. 2B is a cross-sectional view a piggyback magnetic head with helical coils, according to one embodiment.

FIG. 2B illustrates one embodiment of a piggyback magnetic head 201 having similar features to the head 200 of FIG. 2A. As shown in FIG. 2B, two shields 204, 214 flank the stitch pole 208 and main pole 206. Also sensor shields 222, 224 are shown. The sensor 226 is typically positioned between the sensor shields 222, 224.

Figure 3A:
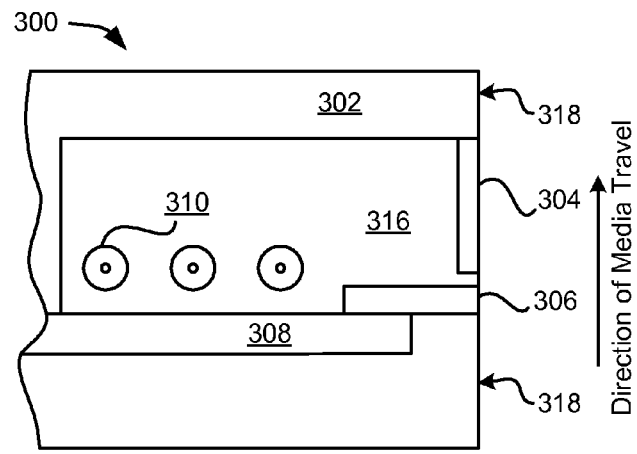
FIG. 3A is a cross-sectional view of a perpendicular magnetic head with looped coils, according to one embodiment.

FIG. 3A is a schematic diagram of another embodiment of a perpendicular magnetic head 300, which uses looped coils 310 to provide flux to the stitch pole 308, a configuration that is sometimes referred to as a pancake configuration. The stitch pole 308 provides the flux to the main pole 306. With this arrangement, the lower return pole may be optional. Insulation 316 surrounds the coils 310, and may provide support for the stitch pole 308 and main pole 306. The stitch pole may be recessed from the ABS 318. The direction of the media travel, as indicated by the arrow to the right of the structure, moves the media past the stitch pole 308, main pole 306, trailing shield 304 which may be connected to the wrap around shield (not shown), and finally past the upper return pole 302 (all of which may or may not have a portion in contact with the ABS 318). The ABS 318 is indicated across the right side of the structure. The trailing shield 304 may be in contact with the main pole 306 in some embodiments.

Figure 3B:
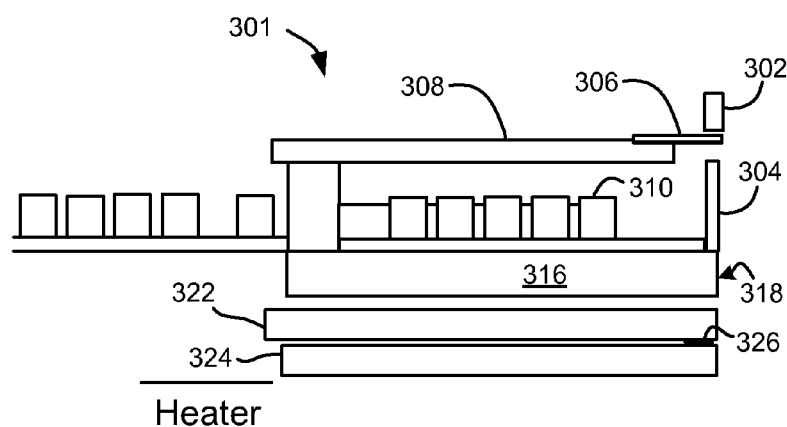
FIG. 3B is a cross-sectional view of a piggyback magnetic head with looped coils, according to one embodiment.

FIG. 3B illustrates another embodiment of a piggyback magnetic head 301 having similar features to the head 300 of FIG. 3A. As shown in FIG. 3B, the piggyback magnetic head 301 also includes a looped coil 310, which wraps around to form a pancake coil. Sensor shields 322, 324 are additionally shown. The sensor 326 is typically positioned between the sensor shields 322, 324.

In FIGS. 2B and 3B, an optional heater is shown near the non-ABS side of the magnetic head. A heater (Heater) may also be included in the magnetic heads shown in FIGS. 2A and 3A. The position of this heater may vary based on design parameters such as where the protrusion is desired, coefficients of thermal expansion of the surrounding layers, etc.

FIG. 4 provides a schematic diagram of a simplified perpendicular recording medium 400, which may also be used with magnetic disk recording systems, such as that shown in FIG. 1. As shown in FIG. 4, the perpendicular recording medium 400, which may be a recording disk in various approaches, comprises at least a supporting substrate 402 of a suitable non-magnetic material (e.g., glass, aluminum, etc.), and a soft magnetic underlayer 404 of a material having a high magnetic permeability positioned above the substrate 402. The perpendicular recording medium 400 also includes a magnetic recording layer 406 positioned above the soft magnetic underlayer 404, where the magnetic recording layer 406 preferably has a high coercivity relative to the soft magnetic underlayer 404. There may one or more additional layers (not shown), such as an "exchange-break" layer or "interlayer", between the soft magnetic underlayer 404 and the magnetic recording layer 406.

The orientation of magnetic impulses in the magnetic recording layer 406 is substantially perpendicular to the surface of the recording layer. The magnetization of the soft magnetic underlayer 404 is oriented in (or parallel to) the plane of the soft underlayer 404. As particularly shown in FIG. 4, the in-plane magnetization of the soft magnetic underlayer 404 may be represented by an arrow extending into the paper.

FIG. 5A illustrates the operative relationship between a perpendicular head 508 and the perpendicular recording medium 400 of FIG. 4. As shown in FIG. 5A, the magnetic flux 510, which extends between the main pole 512 and return pole 514 of the perpendicular head 508, loops into and out of the magnetic recording layer 406 and soft magnetic underlayer 404. The soft magnetic underlayer 404 helps focus the magnetic flux 510 from the perpendicular head 508 into the magnetic recording layer 406 in a direction generally perpendicular to the surface of the magnetic medium. Accordingly, the intense magnetic field generated between the perpendicular head 508 and the soft magnetic underlayer 404, enables information to be recorded in the magnetic recording layer 406. The magnetic flux is further channeled by the soft magnetic underlayer 404 back to the return pole 514 of the head 508.

As noted above, the magnetization of the soft magnetic underlayer 404 is oriented in (parallel to) the plane of the soft magnetic underlayer 404, and may represented by an arrow extending into the paper. However, as shown in FIG. 5A, this in plane magnetization of the soft magnetic underlayer 404 may rotate in regions that are exposed to the magnetic flux 510.

FIG. 5B illustrates one embodiment of the structure shown in FIG. 5A, where soft magnetic underlayers 404 and magnetic recording layers 406 are positioned on opposite sides of the substrate 402, along with suitable recording heads 508 positioned adjacent the outer surface of the magnetic recording layers 406, thereby allowing recording on each side of the medium.

Except as otherwise described herein with reference to the various inventive embodiments, the various components of the structures of FIGS. 1-5B, and of other embodiments disclosed herein, may be of conventional material(s), design, and/or fabricated using conventional techniques, as would become apparent to one skilled in the art upon reading the present disclosure.

As discussed previously, there is a continual push to increase the recording density of HDDs. One method of increasing the recording density of HDDs is to decrease the size of a magnetic read sensor. With specific regard to linear data density along a data track, this generally means reducing the gap thickness of a magnetic sensor.

Currently used sensors, such as Giant Magnetoresistive (GMR) sensors and Tunnel Junction Magnetoresisive (TMR) sensors, typically require 4 magnetic layers, 3 ferromagnetic (FM) and 1 antiferromagnetic (AFM) layer, along with additional nonmagnetic layers. Only one of the magnetic layers serves as the active (or free) sensing layer. The remaining "pinning" layers, while necessary, nonetheless consume a large amount of gap thickness. One way to overcome this is to construct a sensor as a "scissor" sensor that uses only two magnetic "free" layers without additional pinning layers, thus potentially reducing gap thickness to a significant degree. However, the use of such a magnetic sensor results in design and manufacturing challenges. For instance, a particular challenge presented by such a structure concerns field dependent noise associated with a conventional, rectangular shaped scissor sensor stack (i.e., where both magnetic free layers have a rectangular periphery).

Embodiments disclosed herein are directed to novel magnetic scissor sensors that include at least one magnetic free layer having a generally T-shaped periphery to suppress field dependent magnetic noise.

Figure 6:
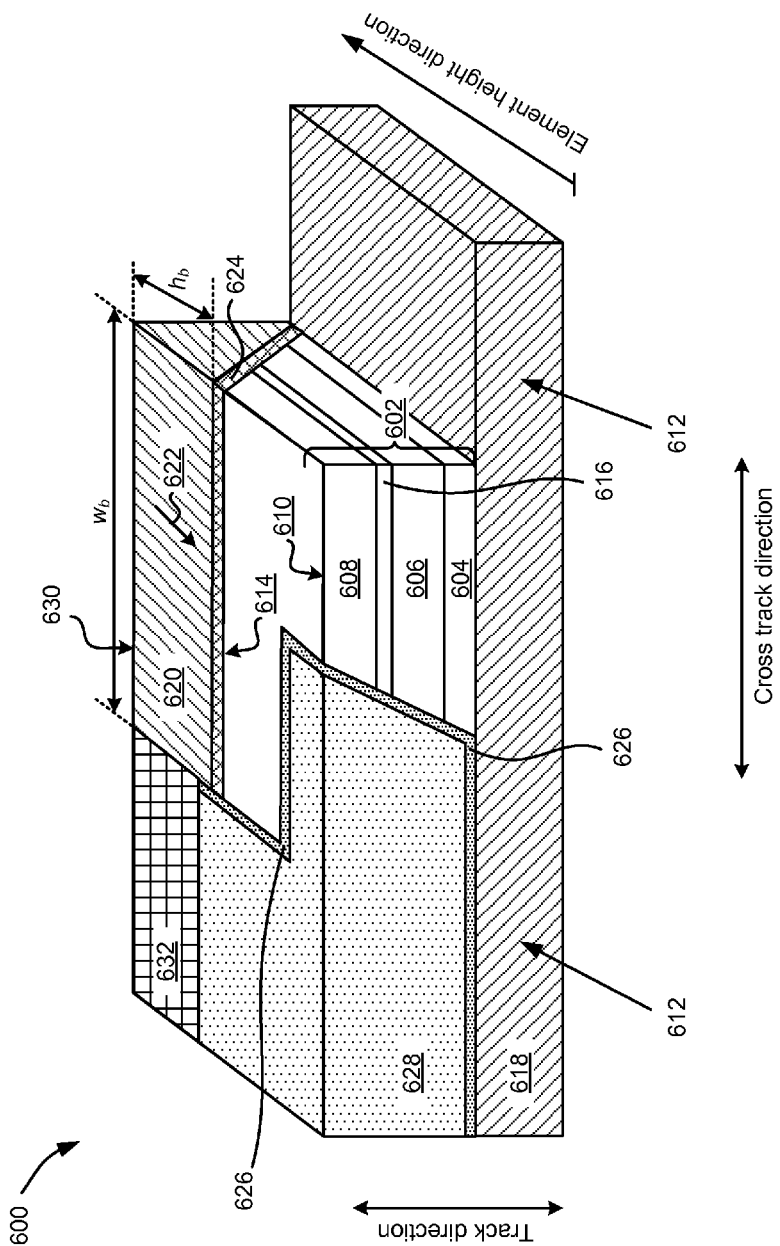
FIG. 6 is a schematic representation of a magnetic read head including a scissor sensor, according to one embodiment.

Referring to FIG. 6, a schematic of a magnetic read head 600 is shown in accordance with one embodiment. As an option, the magnetic read head 600 may be implemented in conjunction with features from any other embodiment listed herein, such as those described with reference to the other FIGS. Of course, the magnetic read head 600 and others presented herein may be used in various applications and/or in permutations which may or may not be specifically described in the illustrative embodiments listed herein. For instance, the magnetic read head 600 may include more or less components than those shown in FIG. 6, in various approaches. Moreover, unless otherwise specified, one or more components of the magnetic read head 600 may be of conventional material(s), design, and/or fabricated using conventional techniques (e.g., sputtering, plating, atomic layer deposition (ALD), chemical vapor deposition (CVD), etc.), as would become apparent to one skilled in the art upon reading the present disclosure.

FIG. 6 provides an isometric cross-sectional view of the magnetic read head 600, with only about half of the track width of the scissor sensor stack 602 being shown. The scissor sensor stack 602 includes a seed layer structure 604 configured to promote a desired grain growth and magnetism in the layers formed thereabove. In various approaches, the seed layer structure 604 may comprises one or more layers, where each layer may independently comprise at least one of NiTa, CrMo, Ti, W, Ru, Ta, CoHf, etc.

The sensor stack 602 also includes a lower scissor free layer 606, and an upper scissor free layer 608 thereabove in a track direction. Each of the scissor free layers 606,608 comprises a front edge 610 that extends along the media facing side 612 of the magnetic read head 600, and a back edge 614 opposite the front edge 610 in an element height direction relative to the media facing side 612. In various approaches, the lower scissor free layer 606 and/or the upper scissor free layer 608 may comprise one or more layers of magnetic material. Exemplary magnetic materials may include, but are not limited to, Ni, Fe, Co, Hf, B, and combinations thereof.

In preferred approaches, at least one of the lower and upper scissor free layers 606,608 may have a generally T-shaped periphery. In the embodiment show in FIG. 6, at least the upper scissor free layer 608 comprises the generally T-shaped periphery. It is important to note, however, that in other approaches: both of the scissor free layers 606,608 may have the generally T-shaped periphery; the upper scissor free layer 608 may have the generally T-shaped periphery, whereas the lower scissor free layer 606 may have a generally rectangular periphery; or the upper scissor free layer 608 may have the generally rectangular periphery, whereas the lower scissor free layer 606 has the generally T-shaped periphery.

With continued reference to FIG. 6, the lower and upper scissor free layers 606,608 are magneto-statically coupled across a separation layer 616. In some approaches, the separation layer 616 may be non-magnetic and electrically insulating (as tunneling barrier). Suitable materials for the separation layer 616 may include, but are not limited to, at least one of MgO, $TiO_2$, AlO, alumina, AgSn, etc.

A lower magnetic shield 618 is positioned below the sensor stack 602 in the track direction. In various approaches, the lower magnetic shield 618 may comprise one or more magnetic materials having a high magnetic permeability (g) to provide effective magnetic shielding. In particular approaches, the lower magnetic shield 618 may comprise at least one of NiFe, CoFe, and other suitable magnetic materials as would become apparent to one having skill in the art upon reading the present disclosure.

The magnetic read head 600 also includes a magnetic bias structure 620, one or more portions of which are positioned behind the back edge 614 of the lower and upper scissor free layers 606,608 in the element height direction. The magnetic bias structure 620 has a magnetization 622 oriented perpendicular to the media facing side 612.

In some approaches, the magnetic bias structure 620 may comprise one or more soft magnetic materials. Suitable soft magnetic materials may include, but are not limited to, Co, Fe, Ni, alloys thereof, and other such soft magnetic materials having a low magnetic coercivity as known in the art.

In approaches where the magnetic bias structure 620 comprises a soft magnetic material, the width, $w_b$, of the magnetic bias structure 620 in the cross track direction is preferably small relative to its height, $h_b$, in the element height direction. In preferred approaches, the height of the magnetic bias structure 620 may be at least twice the width thereof. In approaches where the height of the magnetic bias structure 620 is less than its width, the magnetic bias structure 620 has a shape enhanced magnetic anisotropy that maintains the magnetization 622 orientation even though the magnetic bias structure 620 may have a low magnetic coercivity.

In further approaches, the width of the magnetic bias structure 620 in the cross track direction may be about equal to or greater than the width of at least one of the lower and upper scissor free layers 606,608 in the cross track direction. Of course, the width of the magnetic bias structure 620 may be greater than, about equal, or less than the width of at least one of the lower and upper scissor free layers 606,608 in various embodiments, depending on a desired biasing effect, manufacturing limitations and/or efficiencies, positioning of other components of the read sensor and/or magnetic read head 600, etc.

Additionally, in approaches where the magnetic bias structure 620 comprises one or more soft magnetic materials, the magnetization 622 thereof may be maintained via exchange coupling with a layer of anti-ferromagnetic material. While not shown in FIG. 6, this layer of anti-ferromagnetic material (such as IrMn, PtMn, etc.) may be positioned behind the sensor stack 602 in the element height direction and below, or alternatively above, the magnetic bias structure 620 in the track direction. While this anti-ferromagnetic layer may not in and of itself have a net magnetization, when it is exchange coupled with a layer of magnetic material in the magnetic bias structure 620, it strongly pins the magnetization thereof.

In other approaches, the magnetic bias structure 620 may comprise one or more hard magnetic materials. Suitable hard magnetic materials may include, but are not limited to, CoCr, CoPt, CoCrPt, alloys thereof, and other such hard magnetic materials having a high magnetic coercivity as known in the art.

In more approaches, the magnetic bias structure 620 may comprise a soft/hard magnetic composite with one or more soft magnetic layers stacked with one or more hard magnetic layers, as would be understood by one of skill in the art.

In various approaches, the magnetic bias structure 620 may comprise a magnetic material having a magnetic moment of at least 1.0 T, preferably at least 1.8 T. Furthermore, the magnetic bias structure 620 may have an anisotropy field, Hk, in the element height direction of about 100 to 1000 Oe.

A first insulation layer 624 is positioned between the magnetic bias structure 620 and the sensor stack 602 in the element height direction. The first insulating layer 624 may preferably include one or more nonmagnetic and electrically insulating materials. Suitable materials for the first insulation layer 624 may include, but are not limited to, TaO, SiN, AlO, $Al_2O_3$, SiO, MgO, TiO, etc.

With continued reference to FIG. 6, the sensor stack 602 width (i.e., the width of the sensor stack 602 in the cross track direction) may be defined using photolithography and milling techniques. The defined edges of the sensor stack 602 in the cross track direction may be coated by a second insulating layer 626. In preferred approaches, the second insulating layer 626 may comprise one or more nonmagnetic and electrically insulating materials, such as TaO, SiN, AlO, $Al_2O_3$, SiO, MgO, TiO, etc. The second insulating layer 626 may include one or more of the same materials, or one more different dielectric materials, as the first insulating layer 624.

A third insulating layer 628 may be positioned at least on opposite sides of the sensor stack 602 in the cross track direction. In particular, the third insulating layer 628 may be separated from the sensor stack 602 and/or the lower magnetic shield 618 via the second insulating layer 626. The third insulating layer 628 may be a continuation of the second insulating layer 626 material, may include a different dielectric material, or may include a magnetic material to form side shields.

In the embodiment shown in FIG. 6, the third insulating layer 628 may extend beyond the back edge 614 of at least one of the lower and upper scissor free layers 606,608 in the element height direction, but may not extend to the back edge 630 of the magnetic bias structure 620. In alternative approaches, the third insulating layer 628 may extend to about the back edge 614 of at least one of the lower and upper scissor free layers 606,608 in the element height direction, or may extend to about the back edge 630 of the magnetic bias structure 620.

In approaches where the third insulating layer 628 does not extend to the back edge 630 of the magnetic bias structure 620, a fourth insulating layer 632 may be positioned behind the third insulating layer 628 and on either side of the magnetic bias structure 620. The fourth insulating layer 632 may also preferably comprise one or more nonmagnetic and electrically insulating materials, such as TaO, SiN, AlO, $Al_2O_3$, SiO, MgO, TiO, etc.

While not shown in FIG. 6, a capping layer structure may be positioned above the upper scissor free layer 608 in the track direction to protect the layers of the sensor stack 602 during manufacture thereof. In some approaches, the capping layer structure may also extend above one or more portions of the magnetic bias structure 620 in the track direction. In preferred approaches, the capping layer structure may be non-magnetic. In more approaches, the capping layer structure may comprise one or more layers, where each layer may independently comprise at least one suitable nonmagnetic material such as Ru, Ta, Cr, etc.

While also not shown in FIG. 6, an upper magnetic shield may be positioned above the sensor stack 602 in a track direction. In various approaches, the upper magnetic shield may be the uppermost layer of the magnetic read head 600 in the track direction. The upper magnetic shield may comprise one or more magnetic materials having a high magnetic permeability (p) to provide effective magnetic shielding. In particular approaches, the upper magnetic shield may comprise at least one of NiFe, CoFe, and other suitable magnetic materials as would become apparent to one having skill in the art upon reading the present disclosure.

During operation, a sense current or voltage is applied across the sensor stack 602 in a direction perpendicular to the plane of the layers of the sensor stack 602. In various approaches, the lower and upper magnetic shields may also include an electrically conductive material, and thus function as electrical leads for supplying the sense current or voltage across the sensor stack 602. The electrical resistance across the sensor stack 602 depends upon the direction of magnetization of the lower and upper scissor free layers 606,608 relative to one another. The closer the magnetizations of the lower and upper scissor free layers 606,608 are to being parallel to one another, the lower the resistance will be. Conversely, the closer the magnetizations of the lower and upper scissor free layers 606,608 are to being antiparallel to one another the higher the resistance will be. Since the orientations of the magnetizations of the lower and upper scissor free layers 606,608 are free to move in response to an external magnetic field, this change in magnetization direction and resulting change in electrical resistance can be used to detect a magnetic field such as from an adjacent magnetic media (not shown in FIG. 6). In approaches where the separation layer 616 is an electrically insulating barrier layer, then the scissor sensor operates based on the spin dependent tunneling effect of electrons tunneling through the separation layer 616. In approaches where the separation layer 616 is an electrically conductive spacer layer, then the change in resistance results from spin dependent scattering phenomenon.

FIGS. 7A-7D provide various views of a simplified magnetic read head 700 that includes lower and upper scissor free layers, each of which have a generally T-shaped periphery, according to one embodiment. As an option, the magnetic read head 700 may be implemented in conjunction with features from any other embodiment listed herein, such as those described with reference to the other FIGS. Of course, the magnetic read head 700 and others presented herein may be used in various applications and/or in permutations which may or may not be specifically described in the illustrative embodiments listed herein. For instance, the magnetic read head 700 may include more or less components than those shown in FIGS. 7A-7D, in various approaches. Moreover, unless otherwise specified, one or more components of the magnetic read head 700 may be of conventional material(s), design, and/or fabricated using conventional techniques (e.g., sputtering, plating, atomic layer deposition (ALD), chemical vapor deposition (CVD), etc.), as would become apparent to one skilled in the art upon reading the present disclosure.

Figure 7B:
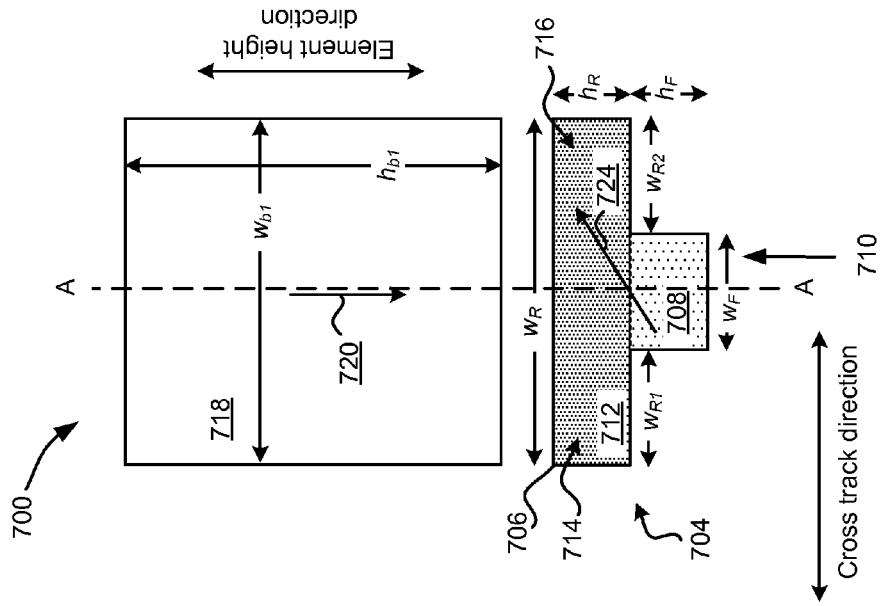
Figure 7A:
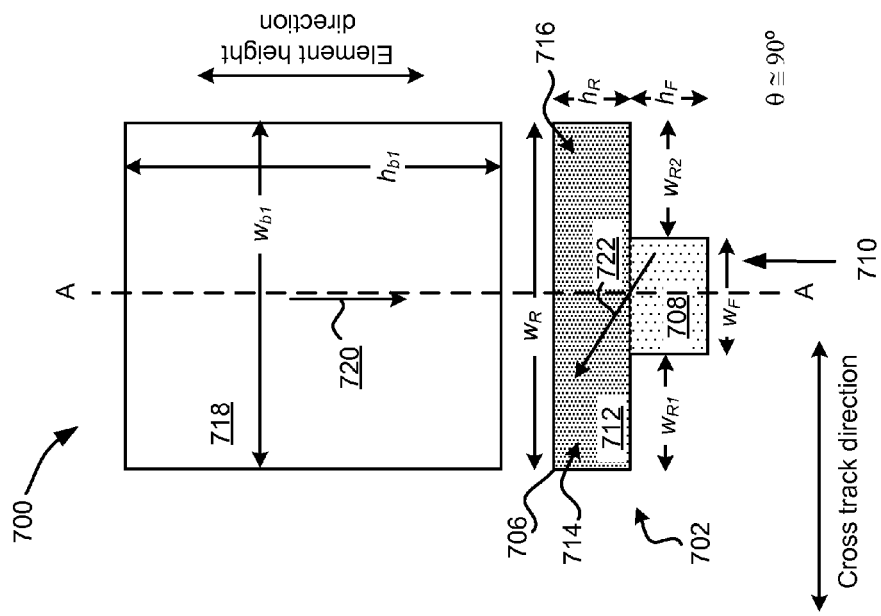

FIGS. 7A and 7B provide top down views of the lower scissor free layer 702 and the upper scissor free layer 704, respectively, included within the magnetic read head 700. In various approaches, the lower and/or upper scissor free layers 702,704 may comprise one or more layers of magnetic material. Exemplary magnetic materials may include, but are not limited to, Ni, Fe, Co, Hf, B, and combinations thereof. It is important to note that while the upper scissor free layer 704 is positioned above the lower scissor free layer 702 in the track direction (as seen in the media facing side view provided in FIG. 7C), the lower and upper scissor free layers 702, 704 are shown singly in FIGS. 7A-7B merely for clarity.

As shown in FIGS. 7A-7B, the lower and upper scissor free layers 702, 704 each have a generally T-shaped periphery 706. Each of the scissor free layers 702, 704 having the generally T-shaped periphery 706 further include a forward region 708 adjacent the media facing side 710, and a rear region 712 extending from the forward region away from the media facing side 710 in an element height direction. The rear region 712 also comprises a first portion 714 and a second portion 716 extending on either side of the forward region 708 in the cross track direction.

The forward region 708 of each scissor free layer 702, 704 has a width, $w_F$, in the cross track direction, and a stripe height, $h_F$, in the element height direction. In some approaches, the width $w_F$ may be in a range from about 15 nm to about 50 nm. In more approaches, the stripe height $h_F$ may be in a range from about 10 nm to about 30 nm. In yet more approaches, the stripe height $h_F$ may be about equal to or less than the width $w_F$. In one particular approach, the width $w_F$ may be about 30 nm, and/or the stripe height $h_F$ may be about 20 nm.

The rear region 712 of each scissor free layer 702, 704 has a width, $w_R$, in the cross track direction and a stripe height, $h_R$, in the element height direction. In some approaches, the width $w_R$ may be in a range from about 30 nm to about 120 nm. In more approaches, the stripe height $h_R$ may be in a range from about 10 nm to about 60 nm. In one particular approach, the width $w_R$ may be about 90 nm, and/or the stripe height $h_R$ may be about 15 nm. In further approaches, the stripe height $h_R$ of the rear region 712 may be less than or equal to the stripe height of $h_F$ of the forward region 708.

As also shown in FIGS. 7A-7B, the first portion 714 of the rear region 712 of each scissor free layer 702, 704 has a width, $w_{R1}$, whereas the second portion 716 of the rear region 712 of each scissor free layer 702, 704 has a width, $w_{R2}$. In one particular approach, the width $w_{R1}$ may be about 30 nm, and/or the width $w_{R2}$ may be about 30 nm. In preferred approaches, the widths $w_{R1}$ and $w_{R2}$ may be about equal. However, in other approaches, the widths $w_{R1}$ and $w_{R2}$ may have different values.

In other preferred approaches, each of the dimensions (e.g., $w_F$, $h_F$, $w_R$, $w_{R1}$, $w_{R2}$, $h_R$) of the lower scissor free layer 702 may be about equal to each of the corresponding dimensions of the upper scissor free layer 704, however this need not be the case. For instance, in some approaches one or more of the dimensions (e.g., $w_F$, $h_F$, $w_R$, $w_{R1}$, $w_{R2}$, $h_R$,) of the lower scissor free layer 702 may have different values than the corresponding dimension(s) of the upper scissor free layer 704.

As shown in the media facing side view of FIG. 7C, the upper scissor free layer 704 is positioned above the lower scissor free layer 702 in the track direction. In particular, one or more portions of the forward region 708 of the upper scissor free layer 704 may be positioned directly above one or more portions of the forward region 708 of the lower scissor free layer 702 in the track direction. Likewise, one or more portions of the rear region 712 of the upper scissor free layer 704 may be positioned directly above one or more portions of the rear region 712 of the lower scissor free layer 702 in the track direction. In preferred approaches, an entirety of the upper scissor free layer 704 may be positioned directly above an entirety of the lower scissor free layer 702 such that the generally T-shaped periphery 706 of the upper scissor free layer 704 directly overlaps the generally T-shaped periphery 706 of the lower scissor free layer 702 in the track direction. However, in other approaches, one or more portions of the rear region 712 of the upper scissor free layer 704 may be offset from one or more portions of the rear region 712 of the lower scissor free layer 702 in the cross track and/or element height directions. Similarly, in still other approaches, one or more portions of the forward region 708 of the upper scissor free layer 704 may be offset from one or more portions of the forward region 708 of the lower scissor free layer 702 in the cross track and/or element height directions.

With continued reference to FIGS. 7A-7B, the magnetic read head 700 includes a magnetic bias structure 718, portions of which extend behind the lower and upper scissor free layers 702, 704 away from the media facing side 710 in the element height direction.

In some approaches, the magnetic bias structure 718 may comprise one or more soft magnetic materials. Suitable soft magnetic materials may include, but are not limited to, Co, Fe, Ni, alloys thereof, and other such soft magnetic materials having a low magnetic coercivity as known in the art. In approaches where the magnetic bias structure 718 comprises a soft magnetic material, the width, $w_{b1}$, of the magnetic bias structure 718 in the cross track direction is preferably small relative to its height, $h_{b1}$, in the element height direction. In preferred approaches, the height of the magnetic bias structure 718 may at least twice the width thereof.

In further approaches, the width, $w_{b1}$, of the magnetic bias structure 718 in the cross track direction may be about equal to or greater than the width, $w_R$, of the rear region 712 of at least one of the lower and upper scissor free layers 702, 704. Of course, the width, $w_{b1}$, of the magnetic bias structure 718 may be greater than, about equal, or less than the width, $w_R$, of the rear region 712 of at least one of the lower and upper scissor free layers 702, 704 in various embodiments, depending on a desired biasing effect, manufacturing limitations and/or efficiencies, positioning of other components of the read sensor and/or magnetic read head 700, etc.

In other approaches, the magnetic bias structure 718 may comprise one or more hard magnetic materials. Suitable hard magnetic materials may include, but are not limited to, CoCr, CoPt, CoCrPt, alloys thereof, and other such hard magnetic materials having a high magnetic coercivity as known in the art. In yet other approaches, the magnetic bias structure 718 may comprise a soft/hard magnetic composite with one or more soft magnetic layers stacked with one or more hard magnetic layers, as would be understood by one of skill in the art.

As further shown in FIGS. 7A-7B, the magnetic bias structure 718 has a magnetization 720 oriented substantially perpendicular to the media facing side 710. The presence of the bias field from the magnetization 720 of the magnetic bias structure 718 cants the magnetization 722 of the lower scissor free layer 702 and the magnetization 724 of the upper scissor free layer 704 in a direction that is not parallel with the media facing side 710 (i.e., cants the magnetizations 722, 724 of the scissor free layers 702, 704 such that they are nearly orthogonal to one another). However, the magnetizations 722, 724 of the scissor free layers 702, 704 may still move relative to one another in response to a magnetic field, such as from a magnetic medium (e.g., a magnetic disk). As discussed above, this change in the directions of magnetizations 722, 724 of the scissor free layers 702, 704 relative to one another changes the electrical resistance across the separation layer (not shown) positioned therebetween in the track direction, and this change in resistance may then be detected as a signal for reading magnetic data from a magnetic medium. The closer the magnetizations 722, 724 of the scissor free layers 702, 704 are to being parallel with one another, the lower the resistance across the scissor free layers 702, 704 will be. Conversely, the closer the magnetizations 722, 724 of the scissor free layers 702, 704 are to being anti-parallel, the higher the resistance will be. The nearly orthogonal orientation of the magnetizations 722, 724 of the scissor free layers 702, 704 causes the resulting signal to be in a substantially linear region of the transfer curve for optimal signal detection.

FIG. 7D provides a cross-sectional view of the magnetic read head 700 taken along line A-A in FIGS. 7A-7B further illustrating the position of the magnetic bias structure 718 relative to the lower and upper scissor free layer 702, 704.

As discussed above, and as illustrated in FIGS. 7A-7B, both the lower and upper scissor free layers 702, 704 have a generally T-shaped periphery 706. In some approaches, the lower and/or upper scissor free layers 702, 704 may be comprised of a single layer, where said single layer has a general T-shape and thus a generally T-shaped periphery.

In yet other approaches, at least one of the lower and upper scissor free layers 702, 704 may be comprised of at least two generally rectangular layers, where the periphery of the combined at least two layers results in the generally T-shaped periphery. For example, FIG. 8 illustrates an embodiment in which a scissor free layer 801 comprises a first layer 802 and a second layer 804 positioned thereabove in the track direction, where the first and second layers 802, 804 each have a generally rectangular shape 806. In preferred approaches, the longitudinal axis (long axis) 808 of the first layer 802 is substantially orthogonal to the longitudinal axis (long axis) 810 of the second layer 804. While the first and second layers 802, 804 each have a generally rectangular shape, the scissor free layer 801 may overall have a generally T-shaped periphery 812 as shown in FIG. 8. It is important to note, however, that in some approaches, the shape of the first and/or second layer 802, 804 need not be rectangular, but may be any shape provided that the combination of the first and second layers 802, 804 (with the second layer 804 above the first layer 802 in the track direction) has a generally T-shaped periphery, such as an exact T-shaped periphery or an alternative T-like shaped periphery as discussed below.

Again with reference to FIGS. 7A-7B, in various approaches the generally T-shaped periphery of at least one of the lower and upper scissor free layers 702, 704 may comprise an exact T-shape or alternative T-like shapes, as discussed below with reference to FIGS. 9-12.

Figure 9:
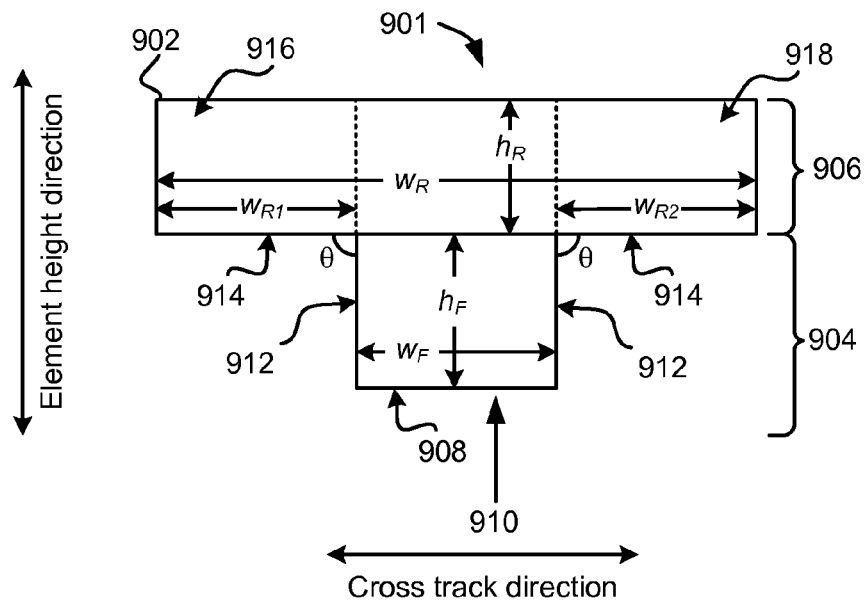
FIG. 9 is a schematic representation of a scissor free layer having an exact T-shaped periphery, according to one embodiment.

For instance, FIG. 9 illustrates an embodiment in which a scissor free layer 901 has an exact T-shaped periphery 902. The scissor free layer 901 having the exact T-shaped periphery 902 may include a forward region 904 and a rear region 906 positioned therebehind in the element height direction. The forward region 904 comprises a front edge 908 extending along the media facing side 910 and a pair of laterally opposed side edges 912 extending from the front edge 908 away from the media facing side 910 in the element height direction. Preferably, the laterally opposed side edges 912 are substantially perpendicular to a plane parallel with the media facing side 910.

In various approaches, the width, $w_F$, of the forward region 904 may be in a range from about 15 nm to about 50 nm. In more approaches, the width $w_F$ may be about equal to or greater than the stripe height, $h_F$, of the forward region 904. In yet more approaches, the stripe height $h_F$ may be in a range from about 10 nm to about 30 nm. In one particular approach, the width $w_F$ may be about 30 nm and/or the stripe height $h_F$ may be about 20 nm.

As also shown in FIG. 9, the rear region 906 has front edges 914 aligned substantially parallel to the media facing side 910. The exact T-shaped periphery 902 may result where the angle, θ, between the front edges 914 of the rear region 906 and the side edges 912 of the forward region 904 is about 90 degrees.

As further shown in FIG. 9, the rear region 906 comprises a width, $w_R$, in the cross track direction and a stripe height, $h_R$, in the element height direction. In some approaches, the width $w_R$ may be in a range from about 30 nm to about 120 nm. In more approaches, the stripe height $h_R$ may be in a range from about 10 nm to about 60 nm. In one particular approach, the width $w_R$ may be about 90 nm, and/or the stripe height $h_R$ may be about 15 nm. In further approaches, the stripe height $h_R$ of the rear region 906 may be less than or equal to the stripe height of $h_F$ of the forward region 904.

The rear region 906 also comprises a first portion 916 and a second portion 918 extending on either side of the forward region 904 in the cross track direction. The first and second portions 916, 918 have widths $w_{R1}$ and $w_{R2}$, respectively. In various approaches, the width $w_{R1}$ (and/or the width $w_{R2}$) may be about 30 nm. In preferred approaches, the widths $w_{R1}$ and $w_{R2}$ may be about equal. However, in other approaches, the widths $w_{R1}$ and $w_{R2}$ may have different values.

Figure 10:
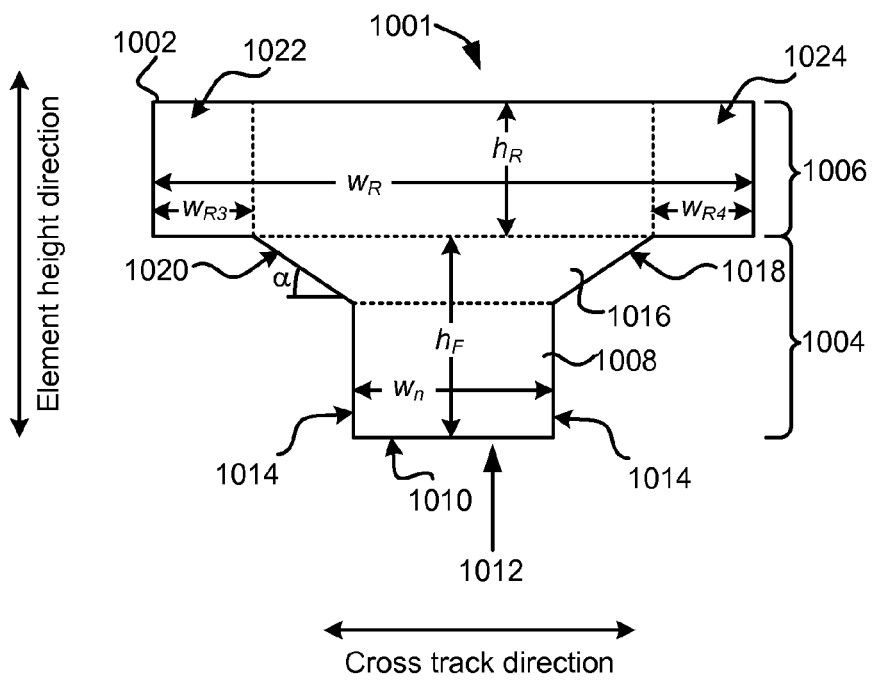
FIG. 10 is a schematic representation of a scissor free layer having a first T-like shaped periphery, according to one embodiment.

FIG. 10 illustrates an embodiment in which a scissor free layer 1001 has a first T-like shaped periphery 1002. The scissor free layer 1001 having the first T-like shaped periphery 1002 may include a forward region 1004 and a rear region 1006 positioned therebehind in the element height direction. The forward region 1004 comprises a neck portion 1008 that has a front edge 1010 extending along the media facing side 1012 and a pair of laterally opposed side edges 1014 extending from the front edge 1010 away from the media facing side 1012 in the element height direction. Preferably, the laterally opposed side edges 1014 are substantially perpendicular to a plane parallel with the media facing side 1012. The forward region 1004 may also comprise a flared portion 1016 having flared edges 1018, 1020 that may each independently define an angle, α, ranging from less than 90 degrees to greater than 0 degrees with respect to a plane parallel with the media facing side 1012.

In various approaches, the width, $w_n$, of the neck portion 1008 in the cross track direction may be in a range from about 15 nm to about 50 nm. In more approaches, the width $w_n$ may be about equal to or greater than the stripe height, $h_F$, of the forward region 1004. In yet more approaches, the stripe height $h_F$ may be in a range from about 10 nm to about 30 nm In one particular approach, the width $w_n$ may be about 30 nm and/or the stripe height $h_F$ may be about 20 nm.

As also shown in FIG. 10, the rear region 1006 has a generally rectangular shape, the longitudinal axis (long axis) of which is aligned substantially parallel to the media facing side 1012. The rear region 1006 comprises a width, $w_R$, in the cross track direction and a stripe height, $h_R$, in the element height direction. In some approaches, the width $w_R$ may be in a range from about 30 nm to about 120 nm. In more approaches, the stripe height $h_R$ may be in a range from about 10 nm to about 60 nm. In one particular approach, the width $w_R$ may be about 90 nm, and/or the stripe height $h_R$ may be about 15 nm. In further approaches, the stripe height $h_R$ of the rear region 1006 may be less than or equal to the stripe height of $h_F$ of the forward region 1004.

As further shown in FIG. 10, the rear region 1006 comprises a first portion 1022 and a second portion 1024 extending from either side of the flared portion 1016 of the forward region 1004 in the cross track direction. The first and second portions 1022, 1024 have widths $w_{R3}$ and $w_{R4}$, respectively. In various approaches, the widths $w_{R3}$ and $w_{R4}$ may be about equal. However, in other approaches, the widths $w_{R3}$ and $w_{R4}$ may have different values.

Figure 11:
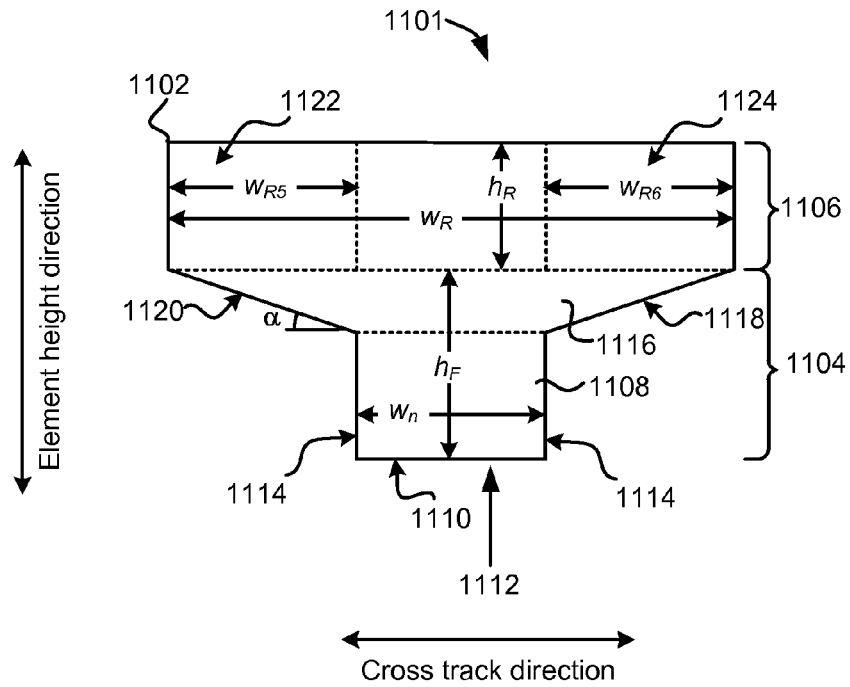
FIG. 11 is a schematic representation of a scissor free layer having a second T-like shaped periphery, according to one embodiment.

FIG. 11 illustrates another embodiment in which a scissor free layer 1101 has a second T-like shaped periphery 1102. The scissor free layer 1101 having the second T-like shaped periphery 1102 includes a forward region 1104 and a rear region 1106 positioned therebehind in the element height direction. The forward region 1104 comprises a neck portion 1108 that has a front edge 1110 extending along the media facing side 1112 and a pair of laterally opposed side edges 1114 extending from the front edge 1110 away from the media facing side 1112 in the element height direction. Preferably, the laterally opposed side edges 1114 are substantially perpendicular to a plane parallel with the media facing side 1112. The forward region 1104 may also comprise a flared portion 1116 having flared edges 1118, 1120 that may each independently define an angle, α, ranging from less than 90 degrees to greater than 0 degrees with respect to a plane that is parallel with the media facing side 1112.

In various approaches, the width, $w_n$, of the neck portion 1108 in the cross track direction may be in a range from about 15 nm to about 50 nm. In more approaches, the width $w_n$ may be about equal to or greater than the stripe height, $h_F$, of the forward region 1104. In yet more approaches, the stripe height $h_F$ may be in a range from about 10 nm to about 30 nm. In one particular approach, the width $w_n$ may be about 30 nm and/or the stripe height $h_F$ may be about 20 nm.

As also shown in FIG. 11, the rear region 1106 has a generally rectangular shape, the longitudinal axis (long axis) of which is aligned substantially parallel to the media facing side 1112. The rear region 1106 comprises a width, $w_R$, in the cross track direction and a stripe height, $h_R$, in the element height direction. In some approaches, the width $w_R$ may be in a range from about 30 nm to about 120 nm. In more approaches, the stripe height $h_R$ may be in a range from about 10 nm to about 60 nm. In one particular approach, the width $w_R$ may be about 90 nm, and/or the stripe height $h_R$ may be about 15 nm. In further approaches, the stripe height $h_R$ of the rear region 1106 may be less than or equal to the stripe height of $h_F$ of the forward region 1104.

As further shown in FIG. 11, the rear region 1106 comprises a first portion 1122 and a second portion 1124 extending on either side of the neck portion 1108 of the forward region 1104 in the cross track direction. The first and second portions 1122, 1124 have widths $w_{R5}$ and $w_{R6}$, respectively. In various approaches, the widths $w_{R5}$ and $w_{R6}$ may be about equal. However, in other approaches, the widths $w_{R5}$ and $w_{R6}$ may have different values.

Figure 12:
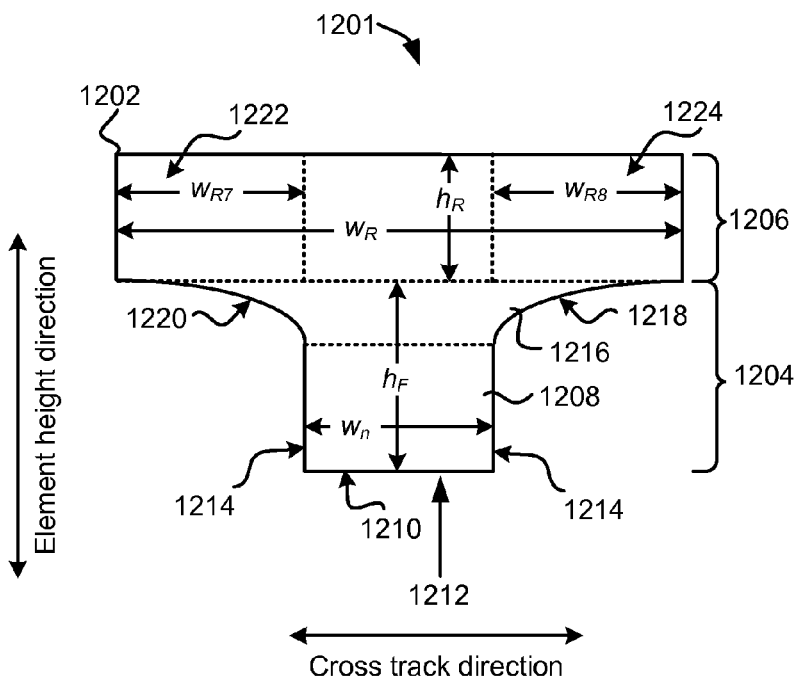
FIG. 12 is a schematic representation of a scissor free layer having a third T-like shaped periphery, according to one embodiment.

FIG. 12 illustrates yet another embodiment in which a scissor free layer 1201 has a third T-like shaped periphery 1202. A scissor free layer 1201 having the third T-like shaped periphery 1202 includes a forward region 1204 and a rear region 1206 positioned therebehind in the element height direction. The forward region 1204 comprises a neck portion 1208 that has a front edge 1210 extending along the media facing side 1112 and a pair of laterally opposed side edges 1214 extending from the front edge 1210 away from the media facing side 1212 in the element height direction. Preferably, the laterally opposed side edges 1214 are substantially perpendicular to a plane parallel with the media facing side 1212. The forward region 1204 may also comprise rounded edges 1218, 1220 that connect the neck portion 1208 of the forward region 1204 to the rear region 1206.

In various approaches, the width, $w_n$, of the neck portion 1208 in the cross track direction may be in a range from about 15 nm to about 50 nm. In more approaches, the width $w_n$ may be about equal to or greater than the stripe height, $h_F$, of the forward region 1204. In yet more approaches, the stripe height $h_F$ may be in a range from about 10 nm to about 30 nm. In one particular approach, the width $w_n$ may be about 30 nm and/or the stripe height $h_F$ may be about 20 nm.

As also shown in FIG. 12, the rear region 1206 has a generally rectangular shape, the longitudinal axis (long axis) of which is aligned substantially parallel to the media facing side 1212. The rear region 1206 comprises a width, $w_R$, in the cross track direction and a stripe height, $h_R$, in the element height direction. In some approaches, the width $w_R$ may be in a range from about 30 nm to about 120 nm. In more approaches, the stripe height $h_R$ may be in a range from about 10 nm to about 60 nm. In one particular approach, the width $w_R$ may be about 90 nm, and/or the stripe height $h_R$ may be about 15 nm. In further approaches, the stripe height $h_R$ of the rear region 1206 may be less than or equal to the stripe height of $h_F$ of the forward region 1204.

As further shown in FIG. 12, the rear region 1206 comprises a first portion 1222 and a second portion 1224 extending on either side of the neck portion 1208 of the forward region 1204 in the cross track direction. The first and second portions 1222, 1224 have widths $w_{R7}$ and $w_{R8}$, respectively. In various approaches, the widths $w_{R7}$ and $w_{R8}$ may be about equal. However, in other approaches, the widths $w_{R7}$ and $w_{R8}$ may have different values.

Figure 13:
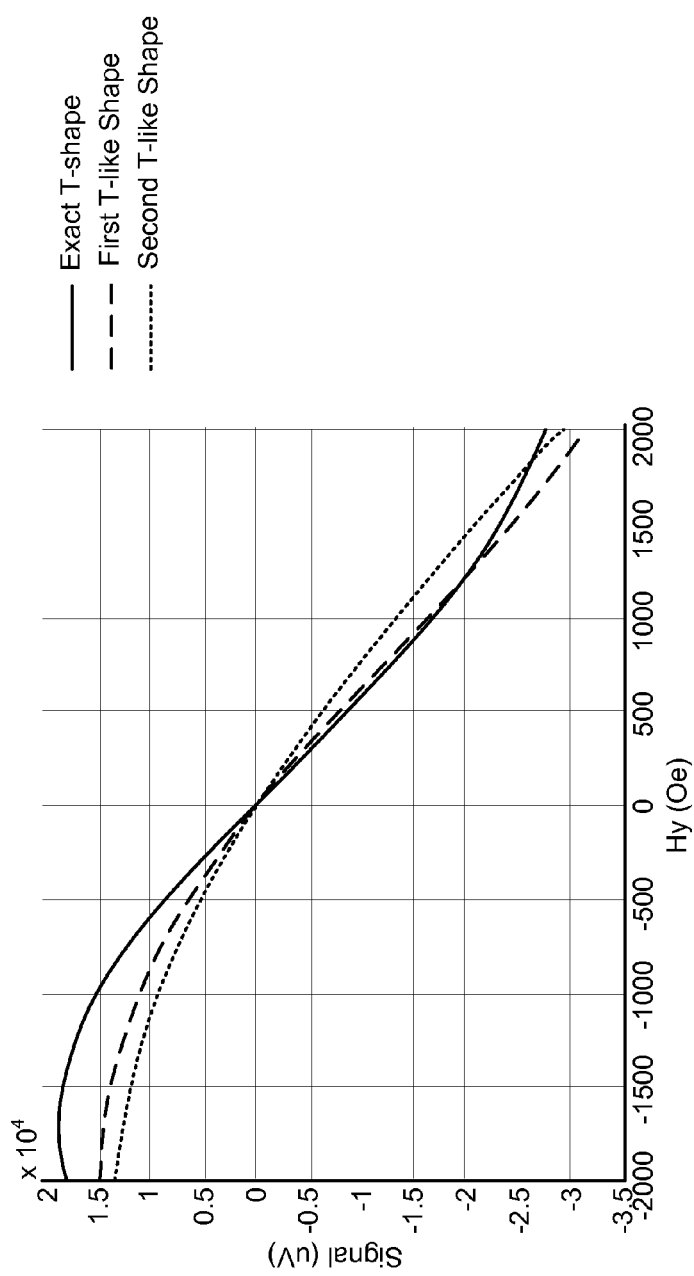
FIG. 13 are transfer curves associated with various T-shaped scissor sensors.

FIG. 13 provides transfer curves associated with a sensor whose scissor free layers each have an exact T-shaped periphery (see e.g., FIG. 9), a sensor whose scissor free layers each have the first T-like shaped periphery (see e.g., FIG. 10), and a sensor whose scissor free layers each have the second T-like shaped periphery (see e.g., FIG. 11). The transfer curves particularly describe the readback signals of the sensors versus an applied external field, $H_y$, as in quasi-static test. As shown in FIG. 13, smooth transfer curves can be achieved for sensors with exact T-shaped or T-like shaped scissor free layers. Moreover, transfer curve saturation at the parallel state (i.e., a high positive $H_y$) is avoided in sensors with exact T-shaped or T-like shaped scissor free layers.

Figure 14:
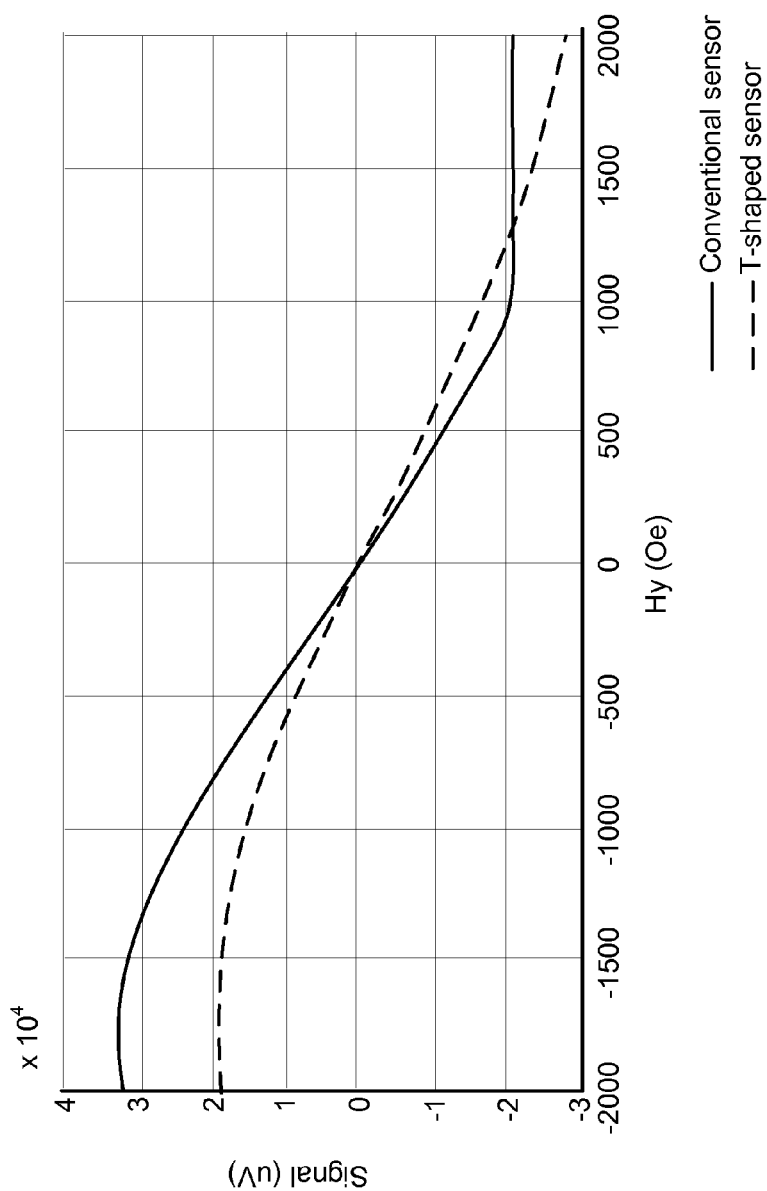
FIG. 14 are transfer curves associated with a conventional sensor whose scissor free layers each have a generally rectangular shaped periphery, and a sensor whose scissor free layers each have a generally T-shaped periphery.

FIG. 14 provides transfer curves associated with a conventional sensor having scissor free layers with a rectangular periphery, and a T-shaped sensor having scissor free layers with a generally T-shaped periphery. In particular, the conventional sensor comprises two, rectangular shaped scissor free layers, each of which have a width in the cross track direction of 30 nm, and a height in the element height direction of 25 nm. The conventional sensor also comprises a magnetic bias structure positioned behind the two, rectangular shaped scissor free layers in the element height direction, where the magnetic bias structure comprises a soft magnetic material and a magnetic moment of 1.4 T. The T-shaped sensor comprises two scissor free layers such as those shown in FIGS. 7A-7B, scissor free layer having the following dimensions ($w_F$=30 nm, $h_F$=20 nm, $w_R$=90 nm, $w_{R1}$=30 nm, $w_{R2}$=30 nm, $h_R$=15 nm). The T-shaped sensor also has a magnetic bias structure positioned behind its two scissor free layers, wherein the magnetic bias structure comprises a soft magnetic material and a magnetic moment of 1.8 T. Comparing the transfer curves of the conventional sensor to that of the T-shaped sensor again reveals that a smooth transfer curve can be achieved for T-shaped sensors.

Figure 15A:
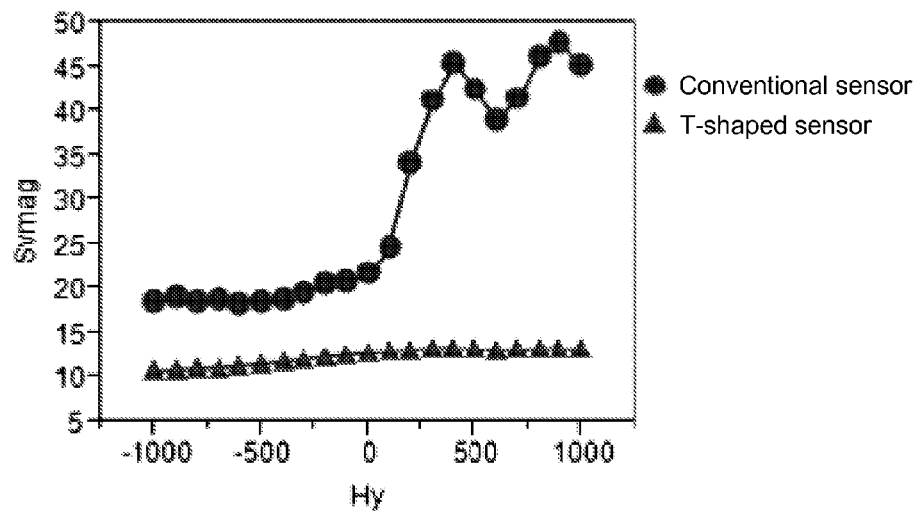
FIGS. 15A-15B are plots of the noise spectrum (noise voltage density in nV/rtHz averaged in 800 MHz bandwidth) and the signal to noise ratio (SNR), respectfully, for a conventional sensor whose scissor free layers each have a generally rectangular shaped periphery, and a sensor whose scissor free layers each have a generally T-shaped periphery.
Figure 15B:
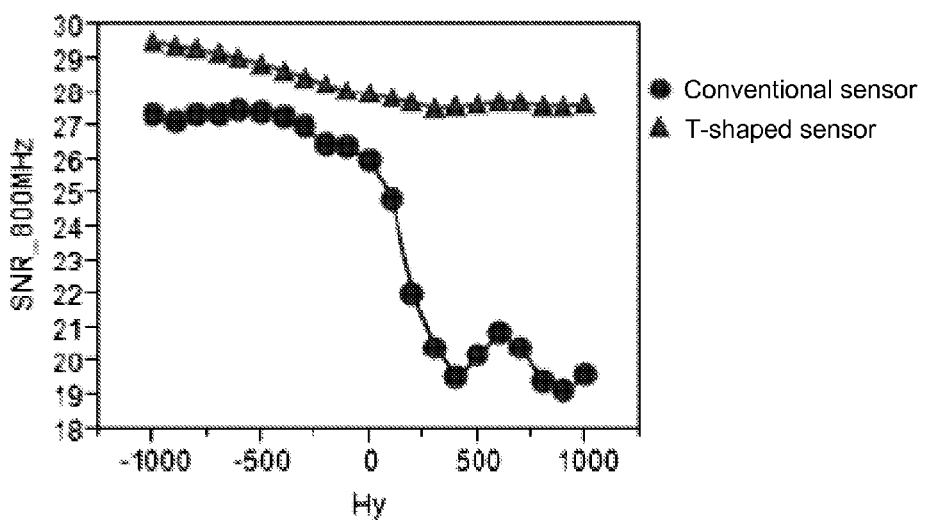

FIGS. 15A and 15B provide plots of the noise spectrum and the signal to noise ratio (SNR), respectfully, for the conventional sensor and T-shaped sensor described above with respect FIG. 14. As shown in FIGS. 15A and 15B, the T-shaped sensor exhibits less noise and greater SNR as compared to the conventional sensor. Indeed, the average SNR gain (over the field range) is 5.5 db for the T-shaped sensor.

Referring now to FIGS. 16A-16D, various views of a simplified magnetic read head 1600 that includes a lower scissor free layer having a generally T-shaped periphery, and an upper scissor free layer having a generally rectangular periphery are shown according to one embodiment. As an option, the magnetic read head 1600 may be implemented in conjunction with features from any other embodiment listed herein, such as those described with reference to the other FIGS. Of course, the magnetic read head 1600 and others presented herein may be used in various applications and/or in permutations which may or may not be specifically described in the illustrative embodiments listed herein. For instance, the magnetic read head 1600 may include more or less components than those shown in FIGS. 16A-16D, in various approaches. Moreover, unless otherwise specified, one or more components of the magnetic read head 1600 may be of conventional material(s), design, and/or fabricated using conventional techniques (e.g., sputtering, plating, atomic layer deposition (ALD), chemical vapor deposition (CVD), etc.), as would become apparent to one skilled in the art upon reading the present disclosure.

It is important to note that magnetic read head 1600 of FIGS. 16A-16D is directed to an exemplary variation of the magnetic read head 700 embodied in FIGS. 7A-7D. Accordingly, various components of the magnetic read head 1600 embodied in FIGS. 16A-16D may have common numbering with those of the magnetic read head 700 embodied in FIGS. 7A-7D.

Figures 16C, 16D:
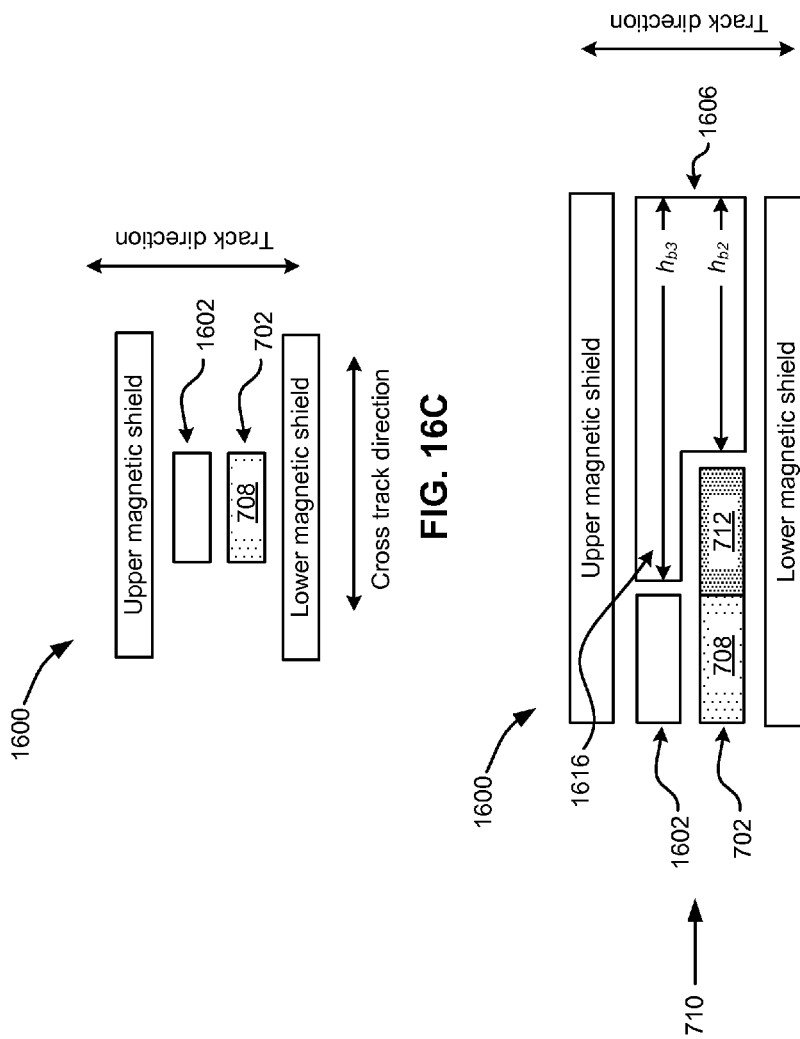

FIGS. 16A and 16B provide top down views of the lower scissor free layer 702 and the upper scissor free layer 1602, respectively, included within the magnetic read head 1600. In various approaches, the lower and/or upper scissor free layers 702,1602 may comprise one or more layers of magnetic material. Exemplary magnetic materials may include, but are not limited to, Ni, Fe, Co, Hf, B, and combinations thereof. It is important to note that while the upper scissor free layer 1602 is positioned above the lower scissor free layer 702 in the track direction (as seen in the media facing side view provided in FIG. 16C), the lower and upper scissor free layers 702,1602 are shown singly in FIGS. 16A-16B merely for clarity.

As particularly shown in FIG. 16A, the magnetic read head 1600 comprises a lower scissor free layer 702 having a generally T-shaped periphery 706. In some approaches, the lower scissor free layer 702 may be comprised of a single layer, where said single layer has a general T-shape and thus a generally T-shaped periphery. In more approaches, the lower scissor free layer 702 may be comprised of at least two layers, where the periphery of the combined at least two layers results in the generally T-shaped periphery (see e.g., FIG. 8). In yet more approaches, the lower scissor free layer 702 may comprise an exact T-shaped periphery as shown in FIG. 9, or any of the T-like shaped peripheries illustrated in FIGS. 10-12.

Again with reference to FIG. 16A, the lower scissor free layer 702 includes a forward region 708 adjacent the media facing side 710, and a rear region 712 extending from the forward region away from the media facing side in an element height direction. The forward region 708 of the lower scissor free layer 702 has a width, $w_F$, in the cross track direction and a stripe height, $h_F$, in the element height direction. Similarly, the rear the rear region 712 of the lower scissor free layer 702 has a width, $w_R$, in the cross track direction and a stripe height, $h_R$, in the element height direction. The rear region 712 also comprises a first portion 714 and a second portion 716 extending on either side of the forward region 708 in the cross track direction, where the first portion 714 has a width, $w_{R1}$, and the second portion 716 has a width, $w_{R2}$. The particular value ranges for each of these dimensions (e.g., $w_F$, $h_F$, $w_R$, $w_{R1}$, $w_{R2}$, $h_R$, etc.) were discussed previously with regard to FIG. 7A.

With reference to FIG. 16B, the upper scissor free layer 1602 has a generally rectangular periphery 1604. The upper scissor free layer 1602 further has a width, $w_{REC}$, in the cross track direction and a stripe height, $h_{REC}$, in the element height direction. In some approaches, the width $w_{REC}$ may be in a range from about 15 nm to about 50 nm. In more approaches, the stripe height $h_{REC}$, may be in a range from about 10 nm to about 30 nm. In yet more approaches, the stripe height $h_{REC}$, may be about equal to or less than the width $w_{REC}$. In one particular approach, the width $w_{REC}$ may be about 30 nm, and/or the stripe height $h_{REC}$, may be about 20 nm.

In further approaches, the width $w_{REC}$ of the upper scissor free layer 1602 may be about equal to the width $w_F$ of the forward region 708 of the lower scissor free layer 702. In additional approaches, the stripe height $h_{REC}$, of the upper scissor free layer 1602 may be about equal to the stripe height $h_F$ of the forward region 708 of the lower scissor free layer 702.

As shown in FIG. 16C, the upper scissor free layer 1602 is positioned above the lower scissor free layer 702 in the track direction. In particular, one or more portions of the upper scissor free layer 1602 may be positioned directly above one or more portions of the forward region 708 of the lower scissor free layer 702 in the track direction. In preferred approaches, an entirety of the upper scissor free layer 1602 may be positioned directly above an entirety of the forward region 708 of the lower scissor free layer 702 such that the upper scissor free layer 1602 directly overlaps the forward region 708 of the lower scissor free layer 702 in the track direction. However, in other approaches, one or more portions of the upper scissor free layer 1602 may be offset from one or more portions of the forward region 708 of the lower scissor free layer 702 in the cross track and/or element height directions.

With continued reference to FIGS. 16A-16B, the magnetic read head 1600 includes a magnetic bias structure 1606, portions of which extend behind the lower and upper scissor free layers 702, 1602 away from the media facing side 710 in the element height direction. In particular, the portion 1608 of the magnetic bias structure 1606 positioned behind the rear region 712 of the lower scissor free layer 702 has a width, $w_{b2}$, in the cross track direction and a height, $h_{b2}$, in the element height direction. The portion 1610 of the magnetic bias structure 1606 positioned behind the upper scissor free layer 1602 has a width, $w_{b3}$, in the cross track direction and a height, $h_{b3}$, in the element height direction.

In some approaches, the magnetic bias structure 1606 may comprise one or more soft magnetic materials. Suitable soft magnetic materials may include, but are not limited to, Co, Fe, Ni, alloys thereof, and other such soft magnetic materials having a low magnetic coercivity as known in the art. In approaches where the magnetic bias structure 1606 comprises a soft magnetic material, the height, $h_{b2}$, of the portion 1608 of the magnetic bias structure 1606 extending behind the lower scissor free layer 702 may be at least twice the width, $w_{b2}$, thereof. Likewise, in such approaches, the height, $h_{b3}$, of the portion 1610 of the magnetic bias structure 1606 extending behind the upper scissor free layer 1602 may be at least twice the width, $w_{b3}$, thereof.

In further approaches, the width, $w_{b2}$, of the magnetic bias structure 1606 extending behind the lower scissor free layer 702 may be about equal to or greater than the width, $w_R$, of the rear region 712 of the lower scissor free layer 702. The width, $w_{b3}$, of the magnetic bias structure 1606 extending behind the upper scissor free layer 1602 may also be about equal to or greater than the width, $w_R$, of the rear region 712 of the lower scissor free layer 702 in more approaches. Of course, the widths $w_{b2}$ and $w_{b3}$ of the magnetic bias structure 1606 may each independently be greater than, about equal, or less than the width, $w_R$, of the rear region 712 of the lower scissor free layer 702 in various embodiments, depending on a desired biasing effect, manufacturing limitations and/or efficiencies, positioning of other components of the read sensor and/or magnetic read head 1600, etc.

In other approaches, the magnetic bias structure 1606 may comprise one or more hard magnetic materials. Suitable hard magnetic materials may include, but are not limited to, CoCr, CoPt, CoCrPt, alloys thereof, and other such hard magnetic materials having a high magnetic coercivity as known in the art. In yet other approaches, the magnetic bias structure 1606 may comprise a soft/hard magnetic composite with one or more soft magnetic layers stacked with one or more hard magnetic layers, as would be understood by one of skill in the art.

As shown in FIGS. 16A-16B, the magnetic bias structure 1606 has a magnetization 1612 oriented substantially perpendicular to the media facing side 710. The presence of the bias field from the magnetization 1612 of the magnetic bias structure 1606 deflects the magnetizations 722, 1614 of the scissor free layers 702, 1602 such that they are orthogonal to one another in the absence of an external magnetic field. However, the presence of an external magnetic field, such as from a magnetic medium, may cause the magnetizations 722, 1614 of the scissor free layers 702, 1602 to deflect either more parallel to one another (away from the media facing side 710) or more antiparallel to one another (toward the media facing side 710).

FIG. 16D provides a cross-sectional view of the magnetic read head 1600 taken along line B-B in FIGS. 16A-16B further illustrating the position of the magnetic bias structure 1606 relative to the lower and upper scissor free layers 702, 1602. In the embodiment shown in FIG. 16D, at least a portion 1616 of the magnetic bias structure 1606 extends above at least a portion of the rear region 712 of the lower scissor free layer 702.

While it may be preferable for at least a portion 1616 of the magnetic bias structure 1606 to extend above at least a portion of the rear region 712 of the lower scissor free layer 702 as shown in FIG. 16D, this need not be the case. For instance, in an alternative approach, the magnetic bias structure 1606 may have an overall, generally rectangular shape such that no portion thereof extends above a portion of the rear region 712 of the lower scissor free layer 702. In such an alternative approach, an insulating fill material may be present between the scissor free layers 702, 1602 and the magnetic bias structure 1606 in the element height direction.

Referring now to FIGS. 17A-17D, various views of a simplified magnetic read head 1700 that includes a lower scissor free layer having a generally rectangular periphery, and an upper scissor free layer having a generally T-shaped periphery is shown according to one embodiment. As an option, the magnetic read head 1700 may be implemented in conjunction with features from any other embodiment listed herein, such as those described with reference to the other FIGS. Of course, the magnetic read head 1700 and others presented herein may be used in various applications and/or in permutations which may or may not be specifically described in the illustrative embodiments listed herein. For instance, the magnetic read head 1700 may include more or less components than those shown in FIGS. 17A-17D, in various approaches. Moreover, unless otherwise specified, one or more components of the magnetic read head 1700 may be of conventional material(s), design, and/or fabricated using conventional techniques (e.g., sputtering, plating, atomic layer deposition (ALD), chemical vapor deposition (CVD), etc.), as would become apparent to one skilled in the art upon reading the present disclosure.

It is important to note that magnetic read head 1700 of FIGS. 17A-17D is directed to another exemplary variation of the magnetic read head 700 embodied in FIGS. 7A-7D. Accordingly, various components of the magnetic read head 1700 embodied in FIGS. 17A-17D may have common numbering with those of the magnetic read head 700 embodied in FIGS. 7A-7D.

Figures 17A, 17B:
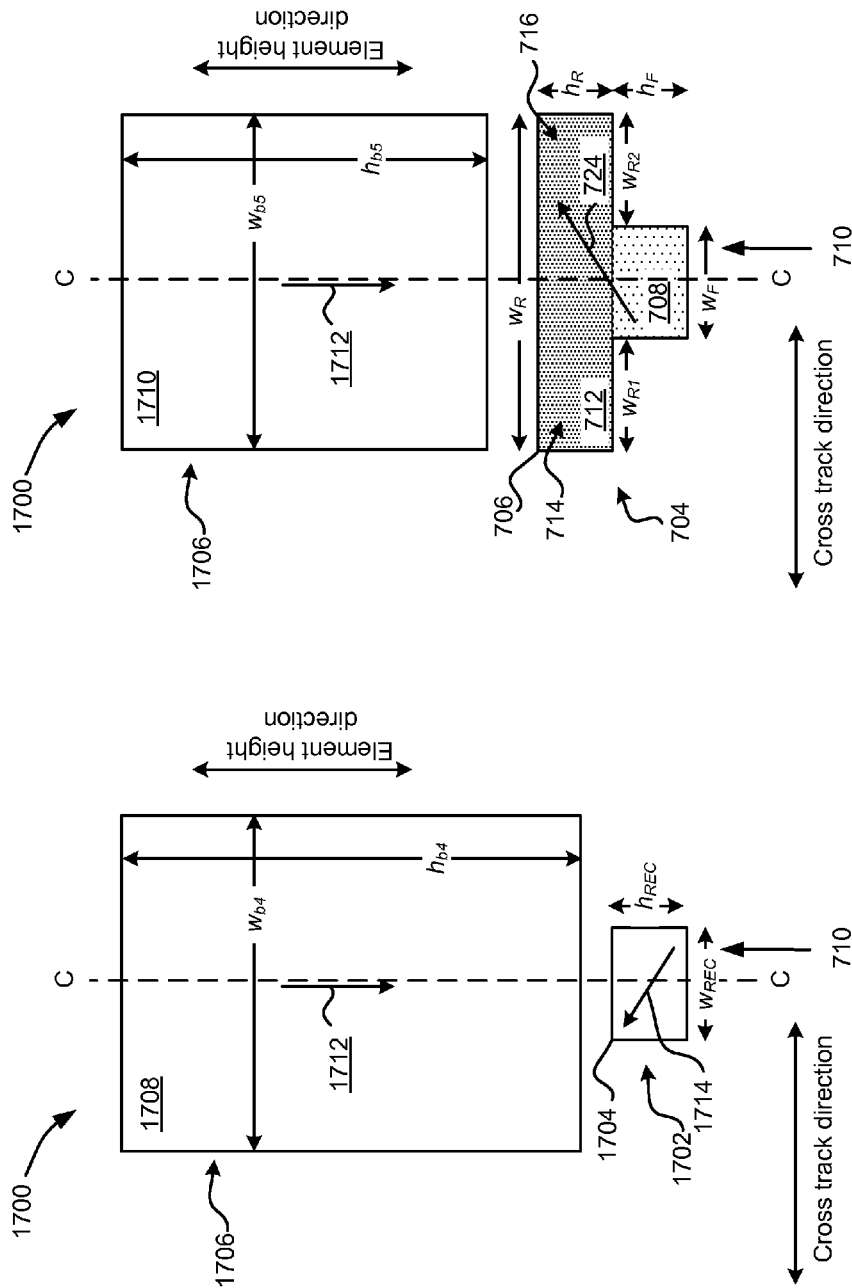

FIGS. 17A and 17B provide top down views of the lower scissor free layer 1702 and the upper scissor free layer 704, respectively, included within the magnetic read head 1700. In various approaches, the lower and/or upper scissor free layers 1702, 704 may comprise one or more layers of magnetic material. Exemplary magnetic materials may include, but are not limited to, Ni, Fe, Co, Hf, B, and combinations thereof. It is important to note that while the upper scissor free layer 704 is positioned above the lower scissor free layer 1702 in the track direction (as seen in the media facing side view provided in FIG. 17C), the lower and upper scissor free layers 1702, 704 are shown singly in FIGS. 17A-17B merely for clarity.

As particularly shown in FIG. 17A, the magnetic read head 1700 comprises a lower scissor free layer 1702 having a generally rectangular periphery 1704. The lower scissor free layer 1702 further has a width, $w_{REC}$, in the cross track direction and a stripe height, $h_{REC}$, in the element height direction. In some approaches, the width $w_{REC}$ may be in a range from about 15 nm to about 50 nm. In more approaches, the stripe height $h_{REC}$ may be in a range from about 10 nm to about 30 nm. In yet more approaches, the stripe height $h_{REC}$ may be about equal to or less than the width $w_{REC}$. In one particular approach, the width $w_{REC}$ may be about 30 nm, and/or the stripe height $h_{REC}$ may be about 20 nm.

As particularly shown in FIG. 17B, the magnetic read head 1700 comprises an upper scissor free layer 704 having a generally T-shaped periphery 706. In some approaches, the upper scissor free layer 704 may be comprised of a single layer, where said single layer has a general T-shape and thus a generally T-shaped periphery. In more approaches, the upper scissor free layer 704 may be comprised of at least two layers, where the periphery of the combined at least two layers results in the generally T-shaped periphery (see e.g., FIG. 8). In yet more approaches, the upper scissor free layer 704 may comprise an exact T-shaped periphery as shown in FIG. 9, or any of the T-like shaped peripheries illustrated in FIGS. 10-12.

Again with reference to FIG. 17B, the upper scissor free layer 704 includes a forward region 708 adjacent the media facing side 710, and a rear region 712 extending from the forward region away from the media facing side in an element height direction. The forward region 708 of the upper scissor free layer 704 has a width, $w_F$, in the cross track direction and a stripe height, $h_F$, in the element height direction. Similarly, the rear the rear region 712 of the upper scissor free layer 704 has a width, $w_R$, in the cross track direction and a stripe height, $h_R$, in the element height direction. The rear region 712 also comprises a first portion 714 and a second portion 716 extending on either side of the forward region 708 in the cross track direction, where the first portion 714 has a width, $w_{R1}$, and the second portion 716 has a width, $w_{R2}$. The particular value ranges for each of these dimensions (e.g., $w_F$, $h_F$, $w_R$, $w_{R1}$, $w_{R2}$, $h_R$, etc.) were discussed previously with regard to FIG. 7B.

In some approaches, the width $w_F$ of the forward region 708 of the upper scissor free layer 704 may be about equal to the width $w_{REC}$ of the lower scissor free layer 1702. In more approaches, the stripe height $h_F$ of the forward region 708 of the upper scissor free layer 704 may be about equal to the stripe height $h_{REC}$ of the lower scissor free layer 1702.

As shown in FIG. 17C, the upper scissor free layer 704 is positioned above the lower scissor free layer 1702 in the track direction. In particular, one or more portions of the forward region 708 of the upper scissor free layer 704 may be positioned directly above one or more portions of the lower scissor free layer 1702 in the track direction. In preferred approaches, an entirety of the forward region 708 of the upper scissor free layer 704 may be positioned directly above an entirety of the lower scissor free layer 1702 such that the forward region 708 of the upper scissor free layer 704 directly overlaps the lower scissor free layer 1702 in the track direction. However, in other approaches, one or more portions of the forward region 708 of the upper scissor free layer 704 may be offset from one or more portions of the lower scissor free layer 1702 in the cross track and/or element height directions.

With continued reference to FIGS. 17A-17B, the magnetic read head 1700 includes a magnetic bias structure 1706, portions of which extend behind the lower and upper scissor free layers 1702, 704 away from the media facing side 710 in the element height direction. In particular, the portion 1708 of the magnetic bias structure 1706 positioned behind the lower scissor free layer 1702 has a width, $w_{b4}$, in the cross track direction and a height, $h_{b4}$, in the element height direction. The portion 1710 of the magnetic bias structure 1706 positioned behind the rear region 712 of the upper scissor free layer 704 has a width, $w_{b5}$, in the cross track direction and a height, $h_{b5}$, in the element height direction.

In some approaches, the magnetic bias structure 1706 may comprise one or more soft magnetic materials. Suitable soft magnetic materials may include, but are not limited to, Co, Fe, Ni, alloys thereof, and other such soft magnetic materials having a low magnetic coercivity as known in the art. In approaches where the magnetic bias structure 1706 comprises a soft magnetic material, the height, $h_{b5}$, of the portion 1710 of the magnetic bias structure 1706 extending behind the upper scissor free layer 704 may be at least twice the width, $w_{b5}$, thereof. Likewise, in such approaches, the height, $h_{b4}$, of the portion 1708 of the magnetic bias structure 1706 extending behind the lower scissor free layer 1702 may be at least twice the width, $w_{b4}$, thereof.

In further approaches, the width, $w_{b5}$, of the magnetic bias structure 1706 extending behind the upper scissor free layer 704 may be about equal to or greater than the width, $w_R$, of the rear region 712 of the upper scissor free layer 704. The width, $w_{b4}$, of the magnetic bias structure 1706 extending behind the lower scissor free layer 1702 may also be about equal to or greater than the width, $w_R$, of the rear region 712 of the upper scissor free layer 704 in more approaches. Of course, the widths $w_{b4}$ and $w_{b5}$ of the magnetic bias structure 1706 may each independently be greater than, about equal, or less than the width, $w_R$, of the rear region 712 of the upper scissor free layer 704 in various embodiments, depending on a desired biasing effect, manufacturing limitations and/or efficiencies, positioning of other components of the read sensor and/or magnetic read head 1700, etc.

In other approaches, the magnetic bias structure 1706 may comprise one or more hard magnetic materials. Suitable hard magnetic materials may include, but are not limited to, CoCr, CoPt, CoCrPt, alloys thereof, and other such hard magnetic materials having a high magnetic coercivity as known in the art. In yet other approaches, the magnetic bias structure 1706 may comprise a soft/hard magnetic composite with one or more soft magnetic layers stacked with one or more hard magnetic layers, as would be understood by one of skill in the art.

As shown in FIGS. 17A-17B, the magnetic bias structure 1706 has a magnetization 1712 oriented substantially perpendicular to the media facing side 710. The presence of the bias field from the magnetization 1712 of the magnetic bias structure 1706 deflects the magnetizations 1714, 724 of the scissor free layers 1702, 704 such that they are orthogonal to one another in the absence of an external magnetic field. However, the presence of an external magnetic field, such as from a magnetic medium, may cause the magnetizations 1714, 724 of the scissor free layers 1702, 704 to deflect either toward or away from the media facing side 710.

FIG. 17D provides a cross-sectional view of the magnetic read head 1700 taken along line C-C in FIGS. 17A-17B further illustrating the position of the magnetic bias structure 1706 relative to the lower and upper scissor free layer 1702, 704. In the embodiment shown in FIG. 17D, at least a portion 1716 of the magnetic bias structure 1606 extends below at least a portion of the rear region 712 of the upper scissor free layer 704.

Now referring to FIGS. 18A-18P, a method for forming a T-shaped scissor sensor is shown using a top view, a side view and a media facing side view of a structure during various stages of a formation process, according to one embodiment. As an option, the present method may be implemented to construct structures such as those shown in the other figures. Of course, the present method and others presented herein may be used to form magnetic structures for a wide variety of devices and/or purposes which may or may not be related to magnetic recording. It should be noted that any aforementioned features may be used in any of the embodiments described in accordance with the various methods. It should also be noted that the present method may include more or less steps than those described and/or illustrated in FIGS. 18A-18P, according to various approaches. Further, the present method and others presented herein may be carried out in any desired environment.

As shown in FIG. 18A, a lower magnetic shield 1802 is formed. The lower magnetic shield 1802 may be formed by methods known in the art, such as electroplating. In various approaches, the lower magnetic shield 1802 may comprise at least one of NiFe, CoFe, and other suitable magnetic materials having a high magnetic permeability (g) to provide effective magnetic shielding as known in the art.

As shown in FIG. 18B, a sensor stack 1804 is formed above the lower magnetic shield 1802. The sensor stack 1804 may comprise a seed layer structure 1806, a lower scissor free layer 1808, a separation layer 1810, an upper scissor free layer 1812, and a capping layer structure 1814 formed near a to-be-formed media facing side 1816, according to preferred approaches.

The seed layer structure 1806 may be configured to promote a desired grain growth and magnetism in the above formed layers. In some approaches, the seed layer structure may comprise one or more layers, where each layer may independently comprise at least one of NiTa, CrMo, Ti, W, Ru, Ta, CoHf, etc.

The lower and upper scissor free layers 1808,1812 are antiparallel coupled across the separation layer 1810, which may preferably be non-magnetic and electrically insulating. Suitable materials for the separation layer 1810 may include, but are not limited to, at least one of MgO, $TiO_2$, AlO, alumina, AgSn, etc. Suitable magnetic materials for the lower and/or upper scissor free layers 1808, 1812 may include, but are not limited to, Ni, Fe, Co, Hf, B, and combinations thereof.

The capping layer structure 1814 may be configured to protect the layers positioned therebelow from damage during manufacture. In particular approaches, the capping layer structure 1814 may comprise one or more layers, where each layer may independently comprise at least one suitable nonmagnetic material such as Ir, Ru, Ta, Cr, etc.

As shown in FIG. 18C, a first mask 1818 is deposited over a portion of the sensor stack 1804. The first mask 1818 includes interior edges 1818*a*, one of which is configured to define a back edge (denoted the "K3 edge") of the sensor stack.

As shown in FIG. 18D, one or more portions of the sensor stack 1804 not covered by the first mask 1818 are removed via a first removal process, thereby leaving one or more exposed portions 1820 of the lower magnetic shield 1802. This first removal process may include ion milling, reactive ion etching (RIE), deep RIE, inductively coupled plasma RIE, or other such suitable removal process as known in the art. This first removal process defines the stripe height of the remaining portions of the sensor stack 1804.

As shown in FIG. 18E, a first insulating layer 1822 is then deposited (e.g., via atomic layer deposition, chemical vapor deposition, or other known deposition techniques) above the first mask 1818 and the exposed portions 1820 of the lower magnetic shield 1802. The first insulating layer 1822 may preferably include one or more nonmagnetic and electrically insulating materials such as TaO, SiN, AlO, $Al_2O_3$, SiO, MgO, TiO, combinations thereof, etc.

A magnetic bias structure 1824 is also deposited (e.g., via atomic layer deposition, chemical vapor deposition, or other known deposition techniques) above the first insulating layer 1822 as also shown in FIG. 18E. In some approaches, the magnetic bias structure 1824 may comprise one or more soft magnetic materials, which may include, but are not limited to, Co, Fe, Ni, alloys thereof, etc. In other approaches, the magnetic bias structure 1824 may comprise one or more hard magnetic materials, which may include, but are not limited to, CoCr, CoPt, CoCrPt, alloys thereof, etc. In more approaches, the magnetic bias structure 1824 may comprise a soft/hard magnetic composite with one or more soft magnetic layers stacked with one or more hard magnetic layers, as would be understood by one of skill in the art. The structure M1 denoted by a dotted line indicates the location of the interior edges 1818*a* of the first mask 1818 for reference.

As shown in FIG. 18F, the first mask 1818 and portions of the first insulating layer 1822 and the magnetic bias structure 1824 positioned thereabove are removed via a chemical liftoff process, or other such suitable process known in the art. The remaining portions of the first insulating layer 1822 and the magnetic bias structure 1824 are thus positioned behind the back edge of the sensor stack 1804 and extend away from the media facing side 1816 in an element height direction. The surface from which the first mask 1818 is removed may be subject to a planarization process (e.g., chemical mechanical polishing) to achieve a substantially flat upper surface.

A nonmagnetic spacer layer 1826 may next be deposited on the substantially flat upper surface, as shown in FIG. 18G. The nonmagnetic spacer layer 1826 may comprise any suitable material known in the art, such as Ru, Ir, etc., and may configured to decouple the sensor stack 1804 and the magnetic bias structure 1824 from a later formed top shield.

A second mask 1828 is subsequently deposited over a portion of the structure as shown in FIG. 18H. The second mask 1828 has a periphery 1828*a*. The second mask 1828 also includes edges that define the width of the sensor stack 1804 in the cross track direction. In particular, the second mask 1828 may have a first pair of edges 1832 that define the width of a forward region of the sensor stack 1804, as well as a second pair of edges 1830 that define a width of a rear region of the sensor stack 1804. As shown in the non-limiting embodiment of FIG. 18H, the first pair of edges 1832 may be configured to define a 30 nm width of a forward region of the sensor stack 1804, whereas the second pair of edges 1830 may be configured to define a 90 nm width of a rear region of the sensor stack 1804.

As shown in FIG. 18I, material not protected by the second mask 1828 is removed via a second removal process, which may include ion milling, reactive ion etching (RIE), deep RIE, inductively coupled plasma RIE, or other such suitable removal process as known in the art.

As shown in FIG. 18J, a second insulating layer 1834 may then be deposited (e.g., via atomic layer deposition, chemical vapor deposition, or other known deposition techniques) above the second mask 1828 and portions of the structure left exposed after the second removal process. The second insulating layer 1834 may preferably include one or more nonmagnetic and electrically insulating materials such as TaO, SiN, AlO, $Al_2O_3$, SiO, MgO, TiO, combinations thereof, etc. The structure M2 denoted by a dotted line indicates the location of the periphery 1828*a* of the second mask 1828 for reference.

A third insulating layer 1836 may be also deposited (e.g., via atomic layer deposition, chemical vapor deposition, or other known deposition techniques) above the second insulating layer 1834 as also shown in FIG. 18J. The third insulating layer 1836 may be a continuation of the second insulating layer 1834 material, may include a different dielectric material, or may include a magnetic material to form side shields.

As shown in FIG. 18K, the second mask 1828 and portions of the second and third insulating layers 1834, 1836 positioned thereabove are removed via a chemical liftoff process, or other such suitable process known in the art. The remaining portions of the second and third insulating layers 1834, 1836 are thus positioned on opposite sides of the sensor stack 1804 in the cross track direction. The surface from which the second mask 1828 is removed may be subject to a planarization process (e.g., chemical mechanical polishing) to achieve a substantially flat upper surface.

A third mask 1838 is next deposited over a portion of the structure as shown in FIG. 18L. The third mask 1838 has a periphery 1838*a*. The third mask 1838 includes edges to define a width of the second and third insulating layers 1834, 1836. The third mask 1838 also includes edges that trims/decreases the height of M2 in the cross track direction.

As shown in FIG. 18M, material not protected by the third mask 1838 is removed via a third removal process, which may include ion milling, reactive ion etching (RIE), deep RIE, inductively coupled plasma RIE, or other such suitable removal process as known in the art.

As shown in FIG. 18N, a fourth insulating layer 1840 may then be deposited (e.g., via atomic layer deposition, chemical vapor deposition, or other known deposition techniques) above the third mask 1838 and portions of the structure left exposed after the third removal process. The fourth insulating layer 1840 may preferably include one or more non-magnetic and electrically insulating materials such as alumina. The structure M3 denoted by a dotted line indicates the location of the periphery 1838a of the third mask 1838 for reference.

As shown in FIG. 18O, the third mask 1838 and portions of the fourth insulating layer 1840 positioned thereabove are removed via a chemical liftoff process, or other such suitable process as known in the art. The remaining portions of the fourth insulating layer 1840 are thus positioned on opposite sides of the magnetic bias structure 1824 in the cross track direction. The surface from which the third mask 1838 is removed may be subject to a planarization process (e.g., chemical mechanical polishing) to achieve a substantially flat upper surface.

An upper magnetic shield 1842 is then deposited above the structure, as shown in FIG. 18P. In various approaches, the upper magnetic shield 1842 may comprise at least one of NiFe, CoFe, and other suitable magnetic materials having a high magnetic permeability (g) to provide effective magnetic shielding as known in the art.

Figure 19:
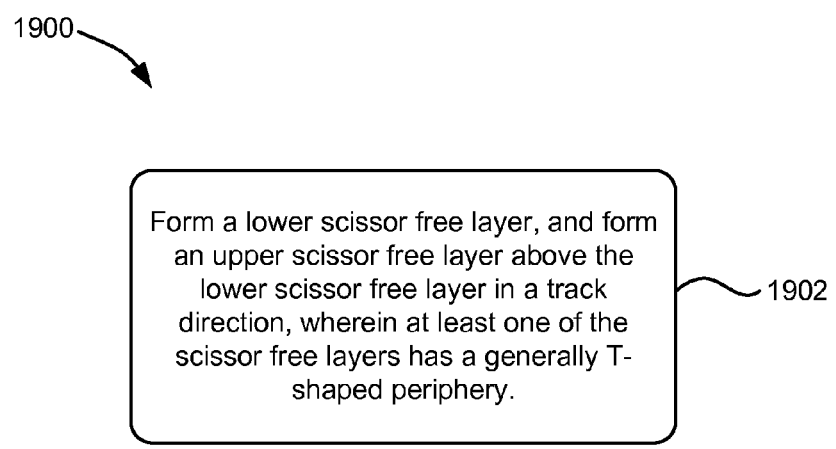
FIG. 19 is a flowchart of a method for forming a magnetic read head that includes at least one scissor free layer having a generally T-shaped periphery, according to one embodiment.

Referring now to FIG. 19, a method 1900 for forming a magnetic read sensor comprising at least one scissor free layer having a generally T-shaped periphery is shown according to one embodiment. As an option, the method 1900 may be implemented to construct structures such as those shown in the other figures. Of course, the method 1900 and others presented herein may be used to form magnetic structures for a wide variety of devices and/or purposes which may or may not be related to magnetic recording. It should be noted that any aforementioned features may be used in any of the embodiments described in accordance with the various methods. It should also be noted that the method 1900 may include more or less steps than those described and/or illustrated in FIG. 19, according to various approaches. Further, the present method and others presented herein may be carried out in any desired environment.

As shown in FIG. 19, the method 1900 includes forming a lower scissor free layer, and forming an upper scissor free layer above the lower scissor free layer in the track direction, wherein at least one of the scissor free layers has a generally T-shaped periphery. See operation 1902. In various approaches, the generally T-shaped periphery may be an exact T-shaped periphery as shown in FIG. 9, a first T-like periphery as shown in FIG. 10, a second T-like periphery as shown in FIG. 11, or a third T-like shaped periphery as shown in FIG. 12.

With continued reference to FIG. 19, in some approaches, the at least one scissor free layer having the generally T-shaped periphery may include a first layer and a second layer above the first layer in a track direction, where the first and second layers each have a generally rectangular shape, and where a longitudinal axis (long axis) of the first layer is substantially orthogonal to the longitudinal axis (long axis) of the second layer.

In more approaches, the lower scissor free layer has the generally T-shaped periphery, and the upper scissor free layer has a generally rectangular periphery.

In yet more approaches, the lower scissor free layer has a generally rectangular periphery, and the upper scissor free layer has the generally T-shaped periphery.

In still more approaches, both the lower and upper scissor free layers have the generally T-shaped periphery.

The method 1900 may further include forming a separation layer between the lower and upper scissor free layers in the track direction, where the separation layer is preferably non-magnetic and electrically insulating. The method 1900 may additionally include forming a lower magnetic shield below the lower scissor free layer in the track direction, and forming an upper magnetic shield above the upper scissor free layer in the track direction. The lower and/or upper magnetic shields may include materials having a high magnetic permeability (g) to provide effective magnetic shielding as known in the art.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic sensor, comprising:
   a lower scissor free layer;
   an upper scissor free layer above the lower scissor free layer in a track direction,
   wherein the lower scissor free layer and the upper scissor free layer each have a generally T-shaped periphery,
   wherein each of the scissor free layers includes a forward region adjacent a media facing side of the magnetic sensor, and a rear region extending from the forward region away from the media facing side in an element height direction; and
   a soft magnetic bias structure, at least a portion thereof positioned behind the rear regions of the upper and lower scissor free layers in the element height direction relative to the media facing side, wherein a height of the soft magnetic bias structure in the element height direction is at least twice a width of the soft magnetic bias structure in a cross track direction.

2. The magnetic sensor as recited in claim 1, wherein a width of the rear region of each of the scissor free layers in a cross track direction is between 2 and 4 times a width of the forward region in the cross track direction.

3. The magnetic sensor as recited in claim 1, wherein a stripe height of the forward region of each scissor free layer is less than or about equal to a width of the forward region thereof in a cross track direction.

4. The magnetic sensor as recited in claim 1, wherein a stripe height of the forward region of each of the scissor free layers is greater than or about equal to a stripe height of the rear region thereof.

5. The magnetic sensor as recited in claim 1, wherein the forward region of each of the scissor free layers comprises a flared portion, the flared portion having at least one edge that defines an angle in a range from greater than 0 degrees to less than 90 degrees with respect to a plane parallel to the media facing side of the magnetic sensor.

6. A magnetic sensor, comprising:
a lower scissor free layer; and
an upper scissor free layer above the lower scissor free layer in a track direction,
wherein at least one of the scissor free layers has a generally T-shaped periphery,
wherein the at least one of the scissor free layers having the generally T-shaped periphery comprises a first layer and a second layer above the first layer in the track direction, wherein the first and second layers each have a generally rectangular shape, wherein a longitudinal axis of the first layer is orthogonal to a longitudinal axis of the second layer.

7. The magnetic sensor as recited in claim 1, wherein the lower scissor layer comprises a first layer and a second layer above the first layer in the track direction, wherein the first and second layers each have a generally rectangular shape, wherein a longitudinal axis of the first layer is orthogonal to a longitudinal axis of the second layer.

8. The magnetic sensor as recited in claim 1, further comprising:
a lower magnetic shield below the lower scissor free layer in the track direction;
an upper magnetic shield above the upper scissor free layer in the track direction; and
a separation layer between the lower and upper scissor free layers in the track direction.

9. A magnetic data storage system, comprising:
at least one magnetic head including the magnetic sensor as recited in claim 1;
a magnetic medium;
a drive mechanism for passing the magnetic medium over the at least one magnetic head; and
a controller electrically coupled to the at least one magnetic head for controlling operation of the at least one magnetic head.

10. A method, comprising:
forming a lower scissor free layer; and
forming an upper scissor free layer above the lower scissor free layer in a track direction,
wherein at least one of the scissor free layers has a generally T-shaped periphery,
wherein the at least one of the scissor free layers having the generally T-shaped periphery comprises a first layer and a second layer above the first layer in the track direction, wherein the first and second layers each have a generally rectangular shape, wherein a longitudinal axis of the first layer is orthogonal to a longitudinal axis of the second layer.

11. The method as recited in claim 10, further comprising:
forming a lower magnetic shield below the lower scissor free layer in the track direction; and
forming an upper magnetic shield above the upper scissor free layer in the track direction.

12. The method as recited in claim 10, wherein one of the scissor free layers has a generally rectangular periphery.

13. The method as recited in claim 10, wherein the lower scissor free layer and the upper scissor free layer each have a generally T-shaped periphery.

\* \* \* \* \*